(12) United States Patent
Leachman et al.

(10) Patent No.: US 8,725,557 B1
(45) Date of Patent: *May 13, 2014

(54) SYSTEM, COMPUTER-IMPLEMENTED METHOD, AND NON-TRANSITORY, COMPUTER-READABLE MEDIUM TO DETERMINE RELATIVE MARKET VALUE OF A SALE GROUP OF LIVESTOCK BASED ON GENETIC MERIT AND OTHER NON-GENETIC FACTORS

(71) Applicant: Leachman Cattle of Colorado, LLC, Fort Collins, CO (US)

(72) Inventors: Leland Leachman, Wellington, CO (US); Tim J. Watts, Billings, MT (US)

(73) Assignee: Leachman Cattle of Colorado, LLC, Fort Collins, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/152,845

(22) Filed: Jan. 10, 2014

Related U.S. Application Data

(63) Continuation of application No. 14/011,304, filed on Aug. 27, 2013, now Pat. No. 8,660,888.

(60) Provisional application No. 61/811,720, filed on Apr. 13, 2013, provisional application No. 61/822,736, filed on May 13, 2013, provisional application No. 61/860,686, filed on Jul. 31, 2013.

(51) Int. Cl.
*G06Q 10/00* (2012.01)
*G06Q 10/06* (2012.01)

(52) U.S. Cl.
CPC ...................................... *G06Q 10/06* (2013.01)
USPC ........ 705/7.39; 705/37; 705/26.35; 705/7.35; 705/26.3; 705/14.11

(58) Field of Classification Search
CPC ... G06Q 30/02; G06Q 30/0206; G06Q 30/06; G06Q 10/087; G06Q 30/0201; G06Q 30/0278; G06Q 10/6393; G06Q 30/018
USPC ........... 705/37, 26.35, 26.3, 14.11, 306, 7.39, 705/27.1, 28, 7.35
See application file for complete search history.

(56) References Cited

U.S. PATENT DOCUMENTS

| | | |
|---|---|---|
| 6,642,946 B1 | 11/2003 | Janes et al. |
| 6,995,675 B2 | 2/2006 | Curkendall et al. |

(Continued)

FOREIGN PATENT DOCUMENTS

| | | |
|---|---|---|
| EP | 1213676 A1 | 12/2002 |
| JP | 2004295434 A1 | 10/2004 |

(Continued)

OTHER PUBLICATIONS

"Estimating Genetic Merit" Swine Genetics. National Swine Improvement Federation (NSIF). Fact Sheet No. 8. Sep. 2003. http://www.nsif.com/Factsheets/nsif8.pdf (4 pages).*

(Continued)

*Primary Examiner* — Elda Milef
(74) *Attorney, Agent, or Firm* — Bracewell & Giuliani LLP

(57) ABSTRACT

Systems, computer-readable medium having computer program, and related computer implemented methods are provided to determine the relative market value of a sale group and to generate a genetic merit scorecard. Such systems, computer-readable medium having computer program, and related computer implemented methods utilize the genetic merit estimates of relatives of a sale group, along with associated economic weighting factors to determine the relative market value of the sale group. The genetic merit scorecard reflects the relative market value and ranking of the genetic merits of the sale group, as compared to the industry.

20 Claims, 22 Drawing Sheets

(56) References Cited

U.S. PATENT DOCUMENTS

| | | | |
|---|---|---|---|
| 7,181,408 | B2 | 2/2007 | Saunders |
| 7,278,373 | B2 | 10/2007 | Fuqua |
| 7,468,248 | B2 | 12/2008 | DeNise et al. |
| 7,584,136 | B2 | 9/2009 | Shuler et al. |
| 7,603,284 | B2 | 10/2009 | Stroman et al. |
| 7,870,840 | B2 | 1/2011 | Valencia et al. |
| 7,904,284 | B2 | 3/2011 | Engelke et al. |
| 8,261,694 | B2 | 9/2012 | Pratt |
| 8,450,064 | B2 | 5/2013 | DeNise et al. |
| 2001/0032161 | A1 | 10/2001 | Thomas et al. |
| 2002/0065765 | A1 | 5/2002 | Shuler et al. |
| 2003/0158773 | A1 | 8/2003 | Brunner |
| 2007/0105107 | A1 | 5/2007 | Wang et al. |
| 2008/0163824 | A1* | 7/2008 | Moser et al. ............ 119/174 |
| 2010/0324356 | A1 | 12/2010 | Cargill et al. |
| 2012/0004112 | A1 | 1/2012 | Lund et al. |

FOREIGN PATENT DOCUMENTS

| | | | |
|---|---|---|---|
| WO | 2009089296 | A2 | 7/2009 |
| WO | 2012149654 | A1 | 11/2012 |

OTHER PUBLICATIONS

Allaire, F.R., et al., Symposium: The Dairy Cow of the Future—Biological Requirements for Economic Efficiency, J. Dairy Science, 1985, pp. 3110-3123, vol. 68, OH.

Groen, A.F., et al., On the use of opportunity costs in deriving the economic value of herd life, Animal Science, 1997, pp. 335-341, vol. 65, UK.

Long, Thomas E., Estimating Genetic Merit, Swine Genetics, Fact Sheet No. 8, 2003, pp. 1-4, US.

Barham, B.L., et al., Factors affecting the selling price of feeder cattle sold at Arkansas livestock auctions in 2005, Journal of Animal Science, 2007, pp. 3434-3441, vol. 85, American Society of Animal Science, US.

Brigham, Brian W., Thesis: Decision Support System for Cow-Calf Producers, Department of Animal Science, Colorado State University, 2011, pp. 1-98, Colorado State University, CO.

MacNeil, N.D., et al., Breeding for Profit: An Introduction to Selection Index Concepts, Range Beef Cow Symposium, Paper 142, 1997, DigitalCommons@UniversityofNebraska—Lincoln, Nebraska.

Schulz, Lee, et al., Factors Affecting Feeder Cattle Prices in Kansas and Missouri, agmanager.info, 2009, KS.

Troxel, T.R., et al., Phenotypic expression and management factors affecting the selling price of feeder cattle sold at Arkansas livestock auctions, The Professional Scientist, 2012, pp. 64-72, vol. 28, American Registry of Professional Animal Scientists, AR.

Williams, G.S., et al., Determinants of Price Differentials in Oklahoma Value-Added Feeder Cattle Auctions, Journal of Agricultural and Resource Economics, 2012, pp. 114-127, vol. 37(1), Western Agricultural Economics Association, US.

Declaration of Leland Leachman and Tim J. Watts dated Nov. 20, 2013 with Exhibits A-I.

Leachman Cattle of Colorado, LLC, Spring Catalog, pp. 1-6, Mar. 10, 2013, Fort Collins, CO.

McDonald, Ty, New Revolutionary "Reputation Feeder Cattle" Program Predicts Genetic Value, Verified Beef Press Release, Mar. 19, 2013, Bozeman, MT.

Verified Beef "Reputation Feeder Cattle" Are You Ready?, Mar. 22, 2013, Presentation at Leachman's Annual Seminar & Sale, Wellington, CO.

Verified Beef Brochure, Mar. 22, 2013, Bozeman, MT.

Leachman Cattle of Colorado, LLC, Spring Catalog, Mar. 10, 2013, available online at http://www.leachman.com/2013SpringCatalog/.

Allaire, F.R., et al., Symposium: The Dairy Cow of the Future—Biological Requirements for Economic Efficiency, J Dairy Science, 1985, pp. 3110-3123, vol. 68, OH.

Groen, A.F., et al., On the use of opportunity costs in deriving the economic value of herd life, Animal Science, 1996, pp. 335-341, vol. 65, UK.

Brown, Sara, Cattle Selections Based on Genetic Merit, Farm Journal Magazine, 2013, pp. 1-3, US.

\* cited by examiner

FIG. 5

GENETIC MERIT INTERFACE — 51

User Information
- Name — 52
- Address — 53
- Herd Description — 54

Genetic Merit Estimate — 55
○ Choose EPD    ○ Enter EPD

[Click to add more Genetic Merit Estimate] — 56    [Submit]

Market Value / Head — 57
Market Value / CWT — 58

[Click to generate Genetic Merit Scorecard] — 59 http://www.verified.beef.com

FIG. 7A

Reputation Feeder
Cattle Certificate

Certificate Date
3/19/2013

Bill Henry
Big Gulch Ranch
Big Sky, MT 93765
1013 Spring Steers
Evaluated at a base weight of 650 lbs

Genetic Merit Scorecard

| | | Relative Market Value / CWT | |
|---|---|---|---|
| Average Daily Gain ★★ | Carcass Weight ★★★ | | Feed:Gain ★★★ |
| Ribeye Area ★★★ | Yield Grade ★★ | | Percentage of Choice ★★★★ |

Age and Source (USDA Audited Certificate)
This certification assures the much origin as noted above. The cattle were born between 4/1/2013 and 5/31/2013.

Calf Management Practices    (VB Audited Certificate - Pending)
These cattle were managed in accordance with prescribed veterinary practices as follows:

| Action | Purpose | Product | Administered/Expected Date |
|---|---|---|---|
| Vaccinated | 8-way Clostridial | Fortress 8 | 5/20/2013 - Audited |
| Vaccinated | IBR PI3, VRSV BVD | BoviShield Gold FP5 | 5/20/2013 - Audited |
| Vaccinated | Pasteurella | One Shot | 5/20/2013 - Audited |
| Dewormed | Internal Parasite Removal | Dectomax | 5 days prior to shipping – pending |

Some of the programs listed on this certificate are PENDING. The certificate for that program will be provided upon receipt of ALL required producer documentation.

Signed: _____

Certificate Number
20131234233242134S

FIG. 7B

Reputation Feeder
Cattle Certificate

Certificate Date
4/29/2013

Genetic Merit Scorecard

Bill Henry
Big Gulch Ranch
Big Sky, MT 95765
2013 Spring Steers
Estimated at a base weight of 600 lbs

| Average Daily Gain | Carcass Weight | Relative Value / CWT |
| --- | --- | --- |
| ★★★ | ★★★ | FeedGain ★★ |
| Ribeye Area | Yield Grade | Percentage of Choice |
| ★★★ | ★★★ | ★★ |

Age and Source (USDA Audited Certificate - Pending)

This certification assures the ranch origin as noted above. The cattle were born between 3/3/2013 and 4/3/2013.

Calf Management Practices     (VB Audited Certificate - Pending)

These cattle were managed in accordance with prescribed veterinary practices as follows:

| Action | Purpose | Product | Administered/Expected Date |
| --- | --- | --- | --- |
| Vaccination | 5-way Clostridial | Express 3 | 5/1/2013 – Audited |
| Vaccination | IBR PI3, VRSV BVD | Vision 3 | 5/1/2013 – Audited |
| Vaccination | 5-way Clostridial | Express 3 | At Weaning – Pending |
| Vaccination | IBR PI3, VRSV BVD | Vision 3 | At Weaning – Pending |

Non-Hormone Treated Cattle (NHTC) (USDA Audited Certificate - Pending)

These cattle have not been administered hormonal growth promotants (HGPs) at any time during their life and also meet all requirements of source and age certification. Any animal identified as noncomforming has been removed from the program. Beef from cattle which are certified under this PVP, from birth to harvest, meet the import requirements established by the European Union.

Cattle Care & Handling  (VB Audited Certificate - Pending)

These cattle have been handled and cared for in accordance to specific portions of the National Beef Quality Assurance (BQA) guidelines.

Signed: _____

VB Verified Beef

Certificate Number
20134943423321642

Some of the programs listed on this certificate are PENDING. The certificate for that program will be provided upon receipt of ALL required producer documentation.

65

SYSTEM, COMPUTER-IMPLEMENTED METHOD, AND NON-TRANSITORY, COMPUTER-READABLE MEDIUM TO DETERMINE RELATIVE MARKET VALUE OF A SALE GROUP OF LIVESTOCK BASED ON GENETIC MERIT AND OTHER NON-GENETIC FACTORS

RELATED APPLICATIONS

This application is a Continuation Application of U.S. Nonprovisional application Ser. No. 14/011,304 filed on Aug. 27, 2013, and claims priority to U.S. Provisional Patent Application Ser. Nos. 61/811,720, filed on Apr. 13, 2013, 61/822,736, filed on May 13, 2013, and 61/860,686 filed on Jul. 31, 2013, all of which are incorporated herein by reference in their entireties.

BACKGROUND

1. Field of the Invention

Embodiments of the present invention relate generally to the field of genetic quality and relative market value of livestock. More specifically, embodiments of the present invention facilitate an owner or potential buyer of one or more sale groups of livestock to evaluate the relative market value of the sale groups based on predictions derived from genetic merit estimates of the herd.

2. Description of Related Art

Ranchers invest significant amounts of money to build a quality herd with the desired genetic merits. Today, ranchers typically invest more than $10,000 per animal in land, machinery, and livestock costs, and then invest more money in high quality bulls. But most ranchers are not able to realize the increased value for the quality of their animals and instead sell their annual calf crops on the commodity market at or near average price. For example, a sale group of calves is valued on many attributes depending on the ultimate purpose for the calves. The top attributes for cattle that are sold to be developed for slaughter (and not for breeding) are the tendency to stay healthy and the genetic potential for growth, carcass merit, and feed efficiency. Additionally, buyers of calves have considerable risk and uncertainty. They prefer to buy superior calves, but have great difficulty assessing the genetic merit and future healthiness of the calves at the time of purchase. Therefore, it is very important to determine what the value of the livestock is and what premium or discount they should command based on these attributes.

Certain breeding associations like the American Angus Association (AAA) generate genetic merit estimates that predict the relative performance of offspring of registered animals on traits that predict market value. AAA also generates several dollar denominated indexes based on the expected progeny differences. These expected progeny differences are usually available only for registered seedstock. For example, one of the indexes from the AAA is Beef Value ($B). This index specifically represents the expected average dollar-per-head difference in the progeny post-weaning performance and carcass value of a progeny of a particular registered sire compared to progeny of other sires.

Recently, some companies offer genomic-enhanced EPD, where information from DNA sequences is used to predict calf genetic merit. The AAA launched a project with Zoetis to utilize DNA-based information to estimate the marbling and gain characteristics of high percentage, unregistered Angus cattle. For example, the GMX™ Score provides documentation to prospective feedlot buyers to assess the relative genetic merit of calves for both marbling and weight gain.

SUMMARY

The Applicants recognize the importance of determining relative market value of a sale group or a group of animals offered for sale from a livestock operation. Various embodiments of methods and apparatus for determining relative market value of a sale group are provided herein. Exemplary embodiments of the present invention include an online genetic merit scorecard system. This system includes one or more processors, an input/output unit adapted to be in communication with the one or more processors, one or more genetic merit databases in communication with the one or more processors to store and associate a plurality of genetic merit estimates with a plurality of economic weighting factors, one or more electronic interfaces positioned to display an online genetic merit scorecard and defining one or more genetic merit interfaces, and non-transitory computer-readable medium. The non-transitory computer-readable medium is positioned in communication with the one or more processors and has one or more computer programs stored thereon including a set of instructions. This set of instructions when executed by one or more processors cause the one or more processors to perform operations of generating the genetic merit interface to display to a user thereof one or more online genetic merit scorecards, determining relative market value and ranking of the genetic merits of the sale group responsive to receiving the plurality of genetic merit estimates from the one or more genetic merit databases and outputting to the one or more electronic interfaces the online genetic merit scorecard for the sale group responsive to determining the relative market value and the ranking of the genetic merits for the sale group. In certain embodiments, the set of instructions may further include determining relative market value for the sale group by use of one or more multivariate non-linear regression equations based on the plurality of genetic merit estimates. The genetic merit interface allows an input of a plurality of genetic merit estimates associated with a sale group. The sale group includes cattle that are fed and harvested for beef production. The online genetic merit scorecard includes the relative market value and one or more rankings of genetic merits of the sale group.

In some embodiments, the online genetic merit scorecard system includes one or more processors, an input/output unit adapted to be in communication with the one or more processors, one or more genetic merit databases in communication with the one or more processors to store and associate a plurality of genetic merit estimates with a plurality of economic outcomes and a plurality of economic weighting factors; and non-transitory computer-readable medium. This non-transitory computer-readable medium is positioned in communication with the one or more processors and having one or more computer programs stored thereon including a set of instructions. This set of instructions when executed by one or more processors cause the one or more processors to perform operations of utilizing one or more electronic interfaces positioned to display an online genetic merit scorecard and defining one or more genetic merit interfaces, then determining, by one or more processors, a plurality of economic weighting factors responsive to receiving the plurality of genetic merit estimates from the genetic merit interfaces and economic outcomes from the one or more genetic merit databases. The instructions further include determining, by one or more processors, relative market value and ranking of the genetic merits of the sale group responsive to receiving the plurality of genetic merit estimates and the plurality of economic weighting factors from the one or more genetic merit databases and outputting to the one or more electronic interfaces the online genetic merit scorecard for the sale group responsive to determining the relative market value and the ranking of the genetic merits for the sale group. The genetic merit interface allows an input of a plurality of genetic merit estimates associated with a sale group. The sale group includes cattle that are fed and harvested for beef production. The online genetic merit scorecard includes the relative market value and one or more rankings of genetic merits of the sale group.

Exemplary embodiments of the invention include a computer-implemented method to determine relative market value of a sale group. The sale group includes cattle that are fed and harvested for beef production. The method includes determining, by one or more processors, a plurality of economic weighting factors responsive to a plurality of genetic merit estimates associated with the sale group and one or more economic outcomes, and then determining, by one or more processors, relative market value and ranking of the genetic merits of the sale group responsive to the plurality of genetic merit estimates and a plurality of economic weighting factors. The method includes outputting to one or more electronic interfaces, positioned to display an online genetic merit scorecard to thereby define one or more genetic merit interfaces, the online genetic merit scorecard for the sale group responsive to determining the relative market value and the ranking of the genetic merits of the sale group. The online genetic merit scorecard includes the relative market value and one or more rankings of genetic merits of the sale group being displayed on the one or more genetic merit interfaces.

In certain embodiments, the online genetic merit scorecard may further include one or more of documentation of calf management practices associated with the sale group positioned to be readily accessible to a user of the one or more electronic interfaces. In certain embodiments, the online genetic merit scorecard may further include one or more of source and age identification of the sale group through an USDA approved process positioned to be readily accessible to a user of the one or more electronic interfaces.

In certain embodiments, the plurality of genetic merit estimates associated with the sale group includes genetic merit estimates of at least two of the following—average daily gain, carcass weight, marbling, back fat thickness, feed to gain ratio, ribeye area, yield grade, tenderness, percentage of choice, pedigree, breed effects, feed intake, animal health, weaning weight, post weaning weight gain, maintenance energy, maternal merit, birth weight, or residual feed intake, residual average daily gain, or any linear or non-linear combination of any two or more of these traits. In certain embodiments, the plurality of genetic merit estimates associated with the sale group may be limited to genetic merit estimates of at least two of the following-feed intake, weaning weight, post-weaning weight gain, carcass weight, marbling, ribeye area, and back fat thickness.

In certain embodiments, the plurality of genetic merit estimates associated with the sale group includes one or more genetic merit estimates obtained from the relatives of the sale group. In certain embodiments, the relatives of the sale group may include one or more sires of the sale group. In some embodiments, the relatives of the sale group may include one or more sires of the sale group and one or more grandsires of the sale group.

Exemplary embodiments of the invention include a computer-implemented method to determine a relative market value of a sale group. An embodiment of this invention includes this computer-implemented method determining the relative market value and a ranking of the genetic merits of a sale group. This computer implemented method has several steps. First, a genetic merit interface is generated to display at one or more of the plurality of remote computers. This genetic merit interface allows a user to input a plurality of information associated with the sale group and to transmit from a respective remote computer the plurality of information associated with the sale group to a genetic merit scorecard system. Then, a relative market value for the sale group is determined in response to receiving the plurality of information associated with the sale group at the respective remote computer. A relative market value and ranking of the genetic merits of the sale group may be determined in response to receiving the plurality of information associated with the sale group at the respective remote computer. A genetic merit scorecard is generated for the sale group in response to determining the relative market value for the sale group. A genetic merit scorecard may be generated for the sale group in response to determining the relative market value and ranking of the genetic merits of the sale group. The genetic merit scorecard may include the relative market value for the sale group and some of the plurality of information associated with the sale group.

The plurality of information associated with the sale group includes at least one of the following: genetic merit estimates associated with the sale group, performance information of the sale group, performance information from a contemporary group, performance information of relatives of the sale group, environmental conditions, management information, and nutritional information.

In another embodiment, the genetic merit estimates associated with the sale group includes at least one of the following: genetic merit estimates of the sale group, genetic merit estimates of relatives of the sale group, and combinations thereof. In an embodiment, the genetic merit estimates of the sale group are obtained from at least one of the following: biometric measurements, DNA analysis, and Expected Progeny Differences of the sale group, and combinations thereof. In an embodiment, the genetic merit estimates of relatives of the sale group are obtained from at least one of the following: biometric measurements, DNA analysis, Expected Progeny Differences of the relatives of the sale group, and combinations thereof.

In certain embodiments, the plurality of genetic merit estimates associated with the sale group includes one or more genetic merit estimates obtained from the relatives of the sale group. In certain embodiments, the relatives of the sale group may include one or more sires of the sale group. In some embodiments, the relatives of the sale group may include one or more sires of the sale group and one or more grandsires of the sale group. In another embodiment, the genetic merit estimates include genetic merit estimates of at least two of the following: average daily gain, carcass weight, marbling, back fat thickness, feed to gain ratio, ribeye area, yield grade, tenderness, percentage of choice, pedigree, breed effects, feed intake, animal health, weaning weight, post weaning weight gain, maintenance energy, maternal merit, birth weight, or residual feed intake, residual average daily gain, or any linear or non-linear combination of any two or more of these traits.

In another embodiment, the plurality of genetic merit estimates associated with the sale group includes genetic merit estimates of feed intake, weaning weight, post-weaning weight gain, carcass weight, marbling, ribeye area, and back fat thickness.

In an embodiment, the sale group may be composed of a plurality of animals of a similar age. In an embodiment, the sale group may be composed of a plurality of animals whose age and source have been verified by a certification process. In an embodiment of the invention, the genetic merit scorecard may include documentation of calf management practices associated with the sale group and source and age identification of the sale group through an USDA approved process, in addition to the relative market value and/or rankings of the genetic merits of the sale group.

By way of example, an embodiment of the invention can include a computer-implemented method to determine a relative market value of a sale group. An embodiment of the present invention can include a computer-implemented method to determine a relative market value and ranking of genetic merits of a sale group. In these embodiments, a genetic merit interface is generated to display at one or more of the plurality of remote computers. This genetic merit interface allows a user to input a plurality of genetic merit estimates associated with the sale group and to transmit from a respective remote computer the plurality of genetic merit estimates to a genetic merit scorecard system. A relative market value for the sale group is determined responsive to receiving the plurality of genetic merit estimates at the respective remote computer. A genetic merit scorecard is generated for the sale group responsive to determining the relative market value for the sale group. A genetic merit scorecard may be generated for the sale group responsive to determining the relative market value and the genetic merits of the sale group. The genetic merit scorecard may include the relative market value for the sale group and at least one genetic merit estimate from the plurality of genetic merit estimates. In an embodiment, the genetic merit scorecard may include ranking of the genetic merits of the sale group. In another embodiment, the plurality of genetic merit estimates associated with the sale group comprises genetic merit estimates of feed intake, weaning weight, post-weaning weight gain, carcass weight, marbling, ribeye area, and back fat thickness.

By way of example, an embodiment of the present invention can include a genetic merit scorecard system. The genetic merit scorecard system can comprise one or more processors: an input/output unit connected to the one or more processors and a non-transitory memory, the input/output unit adapted to be in communication with a plurality of remote computers through a communications network to receive a plurality of genetic merit estimates associated with the sale group, from each of the plurality of remote computers; one or more genetic merit databases to associate the plurality of genetic merit estimates with a plurality of economic weighting factors; and a non-transitory computer-readable medium positioned in communication with the one or more processors and having a computer program stored thereon including a set of instructions. This set of instructions when executed by one or more processors cause the one or more processors to perform operations of: generating a genetic merit interface to display at one or more of the plurality of remote computers, the genetic merit interface allowing an input of a plurality of genetic merit estimates associated with the sale group and to transmit from a respective remote computer the plurality of genetic merit estimates to a genetic merit scorecard system; determining a relative market value for the sale group responsive to receiving the plurality of genetic merit estimates at the respective remote computer; and outputting a genetic merit scorecard for the sale group responsive to determining the relative market value for the sale group. The genetic merit scorecard includes the relative market value for the sale group and at least one genetic merit estimate from the plurality of genetic merit estimates. The genetic merit scorecard includes the relative market value for the sale group and at least one ranking of genetic merits of the sale group.

In another embodiment, the genetic merit scorecard system receives an input of the plurality of genetic merit estimates associated with the sale group including genetic merit estimates of feed intake, weaning weight, post-weaning weight gain, carcass weight, marbling, ribeye area, and back fat thickness.

In another embodiment, the genetic merit scorecard system has the computer program stored thereon that includes a further set of instructions. This further set of instructions when executed by one or more processors cause the one or more processors to further perform operations of: determining a relative market value for the sale group responsive to receiving the plurality of genetic merit estimates at a respective remote computer by using one or more multivariate nonlinear regression equations based on the plurality of genetic merit estimates.

In another embodiment of the genetic merit scorecard system, the genetic merit scorecard further includes a recommended feed regimen for the sale group based on the plurality of genetic merit estimates to optimize the realization of the maximum market potential of the sale group.

In another embodiment of the genetic merit scorecard system, the genetic merit scorecard system has the computer program stored thereon that includes a further set of instructions. This further set of instructions that when executed by one or more processors cause the one or more processors to further perform operations of transmitting the genetic merit scorecard for the sale group to an auction computer. In this embodiment, the genetic merit scorecard system further has one or more buyer computers, each buyer computer being connected to a communication network and having a buyer interface, the buyer interface allowing a buyer to view at least the genetic merit scorecard and to submit bids on price of the sale group: and one or more auction computers, each auction computer being connected to a communication network and having one or more processors performing further operations. These operations include receiving the genetic merit scorecard for the sale group; receiving all bids on price of the sale group from one or more buyer computers; determining a highest bid for the sale group; and facilitating a financial transaction for the buyer with the highest bid to purchase the sale group.

In another embodiment of the genetic merit scorecard system, the genetic merit scorecard system has the computer program stored thereon that includes a further set of instructions. This further set of instructions that when executed by one or more processors cause the one or more processors to further perform operations of transmitting the genetic merit scorecard for the sale group to a broker database. In this embodiment, the genetic merit scorecard system further has one or more buyer computers, each buyer computer being connected to a communication network and a broker database, and having a buyer interface, the buyer interface allowing a buyer to input a plurality of purchasing requirements; one or more broker databases to associate plurality of genetic scorecards for the sale groups with purchasing requirements from the buyer computers; and one or more broker computers, each broker computer being connected to a communication network and a broker database, and having one or more processors performing operations of receiving from the broker database at least one of the following—the plurality of genetic merit estimates associated with the sale group, the relative market value of the sale group, and the genetic merit scorecard of the sale group; receiving the plurality of purchasing requirements from one or more buyer computers; identifying a sale group from the broker database responsive to the purchasing requirements from a particular buyer computer; and facilitating a financial transaction for the particular buyer to purchase the identified sale group.

According to various embodiments of the present invention, a non-transitory computer-readable medium has a computer program stored therein including a set of instructions that when executed by one or more processors cause the one or more processors to perform operations of generating a genetic merit interface to display at one or more of the plurality of remote computers, the genetic merit interface allowing an input of a plurality of genetic merit estimates associated with the sale group and to transmit from the respective remote computer the plurality of genetic merit estimates to a genetic merit scorecard system, determining a relative market value for the sale group responsive to receiving the plurality of genetic merit estimates at a respective remote computer, and outputting a genetic merit scorecard for the sale group responsive to determining the relative market value and genetic merits for the sale group. The genetic merit scorecard includes the relative market value for the sale group and at least one genetic merit estimate from the plurality of genetic merit estimates. The genetic merit scorecard includes the relative market value for the sale group and at least one ranking of genetic merits of the sale group.

An embodiment of the present invention includes a computer-implemented method to determine a relative market value of a sale group. The computer implemented method includes the steps of generating a genetic merit interface to display at one or more of the plurality of remote computers, the genetic merit interface allowing an input of a plurality of information associated with the sale group and to transmit from a respective remote computer the information associated with the sale group to a genetic merit scorecard system, calculating economic outcomes based on simulation models responsive to receiving the information associated with the sale group at the respective remote computer; analyzing the economic outcomes to derive a plurality of economic weighting factors; determining a relative market value for the sale group responsive to the plurality of economic weighting factors and the plurality of information associated with the sale group at the respective remote computer; and outputting a genetic merit scorecard for the sale group responsive to determining the relative market value for the sale group. The genetic merit scorecard may include the relative market value for the sale group and the plurality of information associated with the sale group. The genetic merit scorecard includes the relative market value for the sale group and at least one ranking of genetic merits of the sale group.

By way of example, an embodiment of the present invention can include a genetic merit scorecard system to determine a relative market value of a sale group. The genetic merit scorecard system includes one or more processors; an input/output unit connected to the one or more processors and a non-transitory memory, the input/output unit adapted to be in communication with a plurality of remote computers through a communications network to receive a plurality of information associated with the sale group, from each of the plurality of remote computers; one or more genetic merit databases to associate the plurality of information associated with the sale group with a plurality of economic weighting factors; non-transitory computer-readable medium positioned in communication with the one or more processors and having a computer program stored thereon including a set of instructions. This set of instructions when executed by one or more processors cause the one or more processors to perform operations of: generating a genetic merit interface to display at one or more of the plurality of remote computers, the genetic merit interface allowing an input of a plurality of information associated with the sale group and to transmit from a respective remote computer the information associated with the sale group to a genetic merit scorecard system; calculating economic outcomes based on simulation models responsive to receiving the information associated with the sale group at the respective remote computer; analyzing the economic outcomes to derive a plurality of economic weighting factors; determining a relative market value for the sale group responsive to the plurality of economic weighting factors and the plurality of information associated with the sale group at the respective remote computer; and outputting a genetic merit scorecard for the sale group responsive to determining the relative market value for the sale group. The genetic merit scorecard may include the relative market value for the sale group and the plurality of information associated with the sale group. The genetic merit scorecard includes the relative market value for the sale group and at least one ranking of genetic merits of the sale group.

By way of example, an embodiment of the present invention can include a non-transitory computer-readable medium having computer program stored therein including a set of instructions that when executed by one or more processors cause the one or more processors to perform operations of: generating a genetic merit interface to display at one or more of the plurality of remote computers, the genetic merit interface allowing an input of a plurality of information associated with the sale group and to transmit from a respective remote computer the information associated with the sale group to a genetic merit scorecard system; calculating economic outcomes based on simulation models responsive to receiving the information associated with the sale group at the respective remote computer; analyzing the economic outcomes to derive a plurality of economic weighting factors; determining a relative market value for the sale group responsive to the plurality of economic weighting factors and the plurality of information associated with the sale group at the respective remote computer; and outputting a genetic merit scorecard for the sale group responsive to determining the relative market value for the sale group. The genetic merit scorecard may include the relative market value for the sale group and the plurality of information associated with the sale group. The genetic merit scorecard includes the relative market value for the sale group and at least one ranking of genetic merits of the sale group.

By way of example, an embodiment of the present invention can include a computer-implemented method to determine a national average market value of an animal or a plurality of animals, based on genetic merits. A reported number of potential sires registered by each breed by year of birth and average Expected Progeny Differences for all potential sires of each such year are obtained from a database. Then, the within breed Expected Progeny Differences are adjusted using breed factors that account for scaling and base differences between breeds. Economic weighting factors based on simulation models are applied to the adjusted Expected Progeny Differences. Values for non-reported breeds are estimated based on information obtained from breeds with similar biological characteristics. The national average market value is determined by allocating proportional contribution of each breed as a percentage of the total number of potential sires registered. This national average market value is the base to which all relative market values are compared.

BRIEF DESCRIPTION OF THE DRAWINGS

So that the manner in which the features and benefits of the invention, as well as others which will become apparent, may be understood in more detail, a more particular description of the embodiments of the invention may be had by reference to the embodiments thereof which are illustrated in the appended drawings, which form a part of this specification. It is also to be noted, however, that the drawings illustrate only various embodiments of the invention and are therefore not to be considered limiting of the invention's scope as it may include other effective embodiments as well.

FIG. 5 is a schematic diagram of a genetic merit interface displayed at a remote computer, according to an exemplary embodiment of the present invention.

FIG. 7A is a schematic diagram of a certificate with the genetic merit scorecard, generated using a computer-implemented method according to an exemplary embodiment of the present invention.

FIG. 7B is a schematic diagram of a certificate with the genetic merit scorecard, generated using a computer-implemented method according to an exemplary embodiment of the present invention.

DETAILED DESCRIPTION

Figure 1:
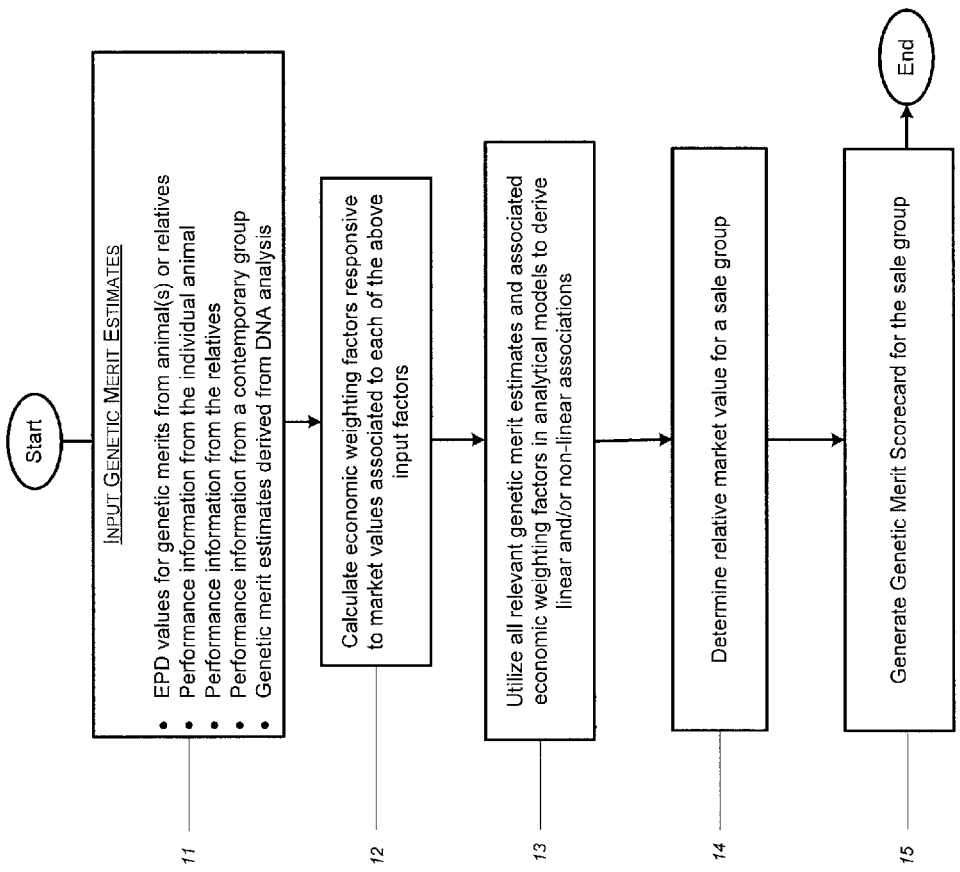
FIG. 1 is a schematic block diagram of an exemplary computer implemented method to determine the relative market value of a sale group.

The present invention will now be described more fully hereinafter with reference to the accompanying drawings, which illustrate various embodiments of the invention. This invention, however, may be embodied in many different forms and should not be construed as limited to the embodiments set forth herein. Rather, these embodiments are provided so that this disclosure will be thorough and complete, and will fully convey the scope of the invention to those skilled in the art. It is to be fully recognized that the different teachings of the various embodiments discussed below may be employed separately or in any suitable combination to produce desired results. The various characteristics mentioned above, as well as other features and characteristics described in more detail below, will be readily apparent to those skilled in the art upon reading the following detailed description of the various embodiments, and by referring to the accompanying drawings. In the drawings and description that follow, like parts are marked throughout the specification and drawings with the same reference numerals, respectively. The prime notation, if used, indicates similar elements in alternative embodiments. The drawings are not necessarily to scale. Certain features of the disclosure may be shown exaggerated in scale or in somewhat schematic form and some details of conventional elements may not be shown in the interest of clarity and conciseness.

Exemplary embodiments of the present invention advantageously provide, for example, systems, computer-readable program products, and related computer-implemented methods to determine a relative market value of a sale group. In a certain embodiment, the sale group is a plurality of animals from a herd of livestock.

As used herein, a herd can be any company of animals of one species, including but not limited to, domestic animals, feeding or traveling together, as the term is known and understood by those skilled in the art. Such animals can include, for example, but are not limited to, cattle and other bovines, sheep, goats, pigs and other swine. A herd may be a group of all male animals, all females, or all young animals, or any combinations thereof. A herd refers to all of the animals on the livestock operation, and may include a sale group, cows, bulls, calves, or any combinations thereof.

As used herein, calves refer to the young of the animals, including but not limited to, the young of domestic animals, for example cattle and other bovines, sheep, goats, pigs and other swine, as the term is known and understood by those skilled in the art. In certain specific embodiments, a calf may refer to a young bovine animal, less than one year of age.

As used herein, a sale group is an animal or a plurality of animals for which a relative market value is determined. In certain embodiments, the sale group is composed of young animals, usually calves. The calves may be unregistered or registered calves. The calves may be individually identified by electronic identification (EID) or Radio-Frequency identification (RFID) tags or buttons. Thus, the relative market value is determined as part of a process verified individual calf identification program. In certain embodiments, the sale group is composed of young animals, selected by age and source. Source and age verification must be documented and verified through a recognized United States Department of Agriculture program. The genetic merit of a sale group cannot be realized without proper health and management practices, including age-appropriate vaccination and other treatment procedures. Without proper documentation of health and other management practices, buyers will discount the realizable value of the genetic merit of the animals due to the risk of sickness and death. The most valuable cattle are the ones with a strong nutritional foundation, solid health history and the genetic background to perform both in the yard and on the rail. In certain embodiments, the sale group is part of a herd. A sale group may be a group of all male animals, all females, or all young animals, or any combinations thereof. In certain specific embodiments, a sale group may be a group of male castrated bovines or steers. In other embodiments, a sale group may be a group of calves, belonging to the same age group. For example, a sale group may be a group of animals of either sex but between 1 and 2 years of age, also known as yearlings. In certain embodiments, a sale group may comprise a single animal. In another embodiment, the sale group is composed of unregistered calves.

In certain other embodiments, the relative market value is determined for a sale group that contains only cattle. In another embodiment, the relative market value is determined for a sale group that has only cattle of a particular breed. In another embodiment, the relative market value is determined for a sale group that has cattle, fed and harvested exclusively for beef production.

During beef production, sale groups are purchased and sold at various stages of the production process. For example, a cow-calf producer maintains a breeding herd of cattle that produce calves. Then the calves may leave the ranch or farm of origin to be in the backgrounder or stocker segment of production, where the calves graze until they reach a particular age and weight range. Some of these calves are sold or purchased for feedlot or feedyard operations. Calves may proceed directly from the farm or ranch of origin to a feedlot to be finished. In the feedlot stage of production, these animals are fed with the intent of adding muscle and fat appropriately until they reach market weight. This process may be referred to as finishing or fattening. The cattle may be fed a grain-based diet or allowed to feed on grass pastures. Once the cattle reach the desired or market weight, they are sent to a processing facility to be harvested. The relative market value of a sale group may be determined at any stage of the beef production process. In certain embodiments, the relative market value of a sale group is determined prior to the feedlot stage of production. In certain embodiments, the relative market value of a sale group is determined for marketing to auction markets, to backgrounding facilities, to finishing facilities, or to any other operator in the beef production process. In certain embodiments, the relative market value of a sale group is determined when the calves are sold or purchased after the cow-calf stage of production. In other embodiments, the relative market value of a sale group is determined when cattle are sold or purchased after the backgrounder or stocker segment of production.

Breed associations, like the American Angus Association (AAA), offer predictions of the genetic merit differences of offspring of one registered ancestor versus offspring of another registered ancestor. AAA does not offer predictions of genetic merit for groups of calves out of multiple ancestors, nor do they offer predictions for animals out of unregistered ancestors. The predictions offered by AAA and other breed associations cannot be compared across databases or across breeds. Thus, for example, a prediction on Angus cattle cannot be directly compared to a prediction on Hereford cattle. No association currently offers predictions that can incorporate offspring of animals from multiple databases (i.e., from multiple breeds with separate databases or even from different country databases on the same breed).

As used herein, ancestors refer to the forebears of an animal or a plurality of animals, as the term is known and understood by those skilled in the art. Such animals can include, for example, but are not limited to, dams, sires, granddams, and grandsires. For example, the ancestors of a herd of calves include the bull, the cow, and the parents of the bull and the cow. The genetic merits of the ancestors are the inherited productivity or performance qualities that are transmitted to the progeny.

The term "progeny" refers to any and all future generations derived or descending from an animal. The term "grandprogeny" refers to the second generation derived or descending from an animal.

The term "relatives" refers to any and all lineal descendants, collateral descendants, lineal ancestors, collateral ancestors, siblings, half-siblings and other kin related by blood to an animal or a plurality of animals. For example, the relatives of a herd of calves may include the bulls, the cows, other offspring of the bulls and the cows, and the parents and siblings of the bulls and the cows. The genetic merits of the relatives are the inherited productivity or performance qualities that are transmitted to the progeny. These genetic merits are predicted from all available observations on all relatives.

Genetic merit is the term used to describe the influence of an animal's genetic makeup on the expression of that animal's phenotype. Genetic merits depend on the animal's genetic makeup and may include interactions with non-genetic factors. Genetic merits can be determined by both biometric measurements, and genetic tests that involve obtaining samples of DNA from an individual animal. Genetic merits, for example, include, but are not limited to, carcass merit, carcass weight, average daily gain, and feed efficiency. These genetic merits drive feedlot and harvest profitability. While assessing the relative market value of a young animal or a sale group, one could utilize predictions of its genetic merits derived from the relatives, or use these predictions in combination with the measurements obtained from the animal or the sale group, and the external factors in which the animals have been raised. External factors that affect the expression of the genetic merit of an animal as a phenotype include, for example, production or growth environment conditions, management systems, nutrition, or combinations of such factors. Certain genotypes may enable an animal to display superior performance in certain environmental conditions. Environmental factors like weather, parasites and stress may affect the genetic merit and therefore, its relative market value. Management strategies, like transportation, production systems, time on feed and feed quality, also affect cattle performance and therefore, its relative market value. These environmental factors and management strategies as applicable to the sale group, its relatives, and its contemporary group are captured as inputs into the genetic merit scorecard system. In certain embodiments of this invention, relative market value is determined by analytical models that also account for these external factors. Market value of an animal may also be determined based on an estimate of the genetic value of an animal as a parent. So the market value of such an animal would be the mathematical analysis of the predictions regarding the transmissibility of its genetic merits.

The term "genetic merit estimate" as used herein refers to predictions and/or biometric measurements of genetic merits. Most commonly, predictions about the genetic merits are used to characterize the value of the ancestor as a breeding animal relative to other breeding animals. Predictions of genetic merit have never been used to predict the relative market value of multi-breed feeder calves compared to a genetic merit based national market value average. Embodiments of the present invention utilize genetic merit estimates obtained from relatives of the sale group and the sale group itself and include at least two of the following: average daily gain, carcass weight, marbling, back fat thickness, feed to gain ratio, ribeye area, yield grade, tenderness, percentage of choice, pedigree, breed effects, feed intake, animal health, weaning weight, post weaning weight gain, maintenance energy, maternal merit, birth weight, or residual feed intake, residual average daily gain, or any linear or non-linear combination of any two or more of these traits. The genetic merit estimates may also factor in information from the plurality of animals directly including phenotypes, parentage, and DNA information including genomic predictions obtained from single nucleotide polymorphism information or DNA sequence information. The genetic merit estimates as utilized in this invention may be derived from genetic tests, phenotypes, or Expected Progeny Differences ("EPD"). Embodiments of the invention may also utilize information from genetic tests performed on the animal or its relatives or the sale group to measure the DNA markers or other DNA sequence information.

In certain embodiments, the plurality of genetic merit estimates associated with the sale group includes one or more genetic merit estimates obtained from the relatives of the sale group. In certain embodiments, the relatives of the sale group may include one or more sires of the sale group. In some embodiments, the relatives of the sale group may include one or more sires of the sale group and one or more grandsires of the sale group.

One of the most reliable determinants of the genetic merit estimate is Expected Progeny Differences or EPD. They are valuable predictions used for selecting breeding animals. EPD is the prediction of how the progeny of an animal will perform relative to the progeny of animals within the same dataset being analyzed. This dataset may include a herd, an entire breed, or a plurality of breeds, and may include animals of multiple breed compositions. For example, the database contains phenotypic observations, contemporary groupings, and sometimes DNA observations that are then compared to a relationship matrix of all animals in the database. The relationship matrix ties together all animals in the database by showing their degree of relatedness on a scale of 0 (unrelated) to 1 (clone). EPD can be adjusted to reflect across data set differences, including across breed differences. So when two animals are compared using their EPD, the EPD indicate the differences one can expect to see in the progeny. EPD are most commonly expressed as units of measure for the genetic merit estimates, positive or negative. Some EPD are expressed as proportional values such as probabilities. Some EPD are expressed as standardized values. Genetic merit estimates such as EPD for birth weight, weaning weight, post-weaning weight gain are expressed in pounds. EPD used in this invention are obtained from several sources, including, but not limited to, inventors' proprietary databases (e.g., the Leachman database) and publicly available databases like those maintained by breed associations. EPD are subject to change as more records are added, because the prediction of genetic merit changes depending on the available information. More records are added as new measures are taken, new animals are born, and new herds are added to the databases. Accuracy is a measure of the reliability that can be placed on the EPD. An accuracy of close to 1.0 indicates higher reliability for that EPD, and is usually impacted by the number of data points that are captured for the relatives.

EPD are unbiased predictions of genetic differences, but EPD are not 100% accurate. Accuracy is a measure of the reliability that can be placed on the EPD. An accuracy of close to 1.0 indicates higher reliability for that EPD, and is usually impacted by the number of data points that are captured for the relatives of the animal. Accuracy can also be affected by the technology and methods involved in the production of the EPD. EPD that include observations or biometric measurements and DNA markers can have a higher accuracy value than EPD that are produced using only pedigree estimates. The accuracy of the mean EPD of a group of animals is typically much higher than the accuracy of the EPD for individual animals. As an example, one might take individual estimates of weights of a group of 250 animals. The accuracy (the proximity of true value to the predicted or measured value) associated with each estimate of individual weight is relatively low. However, the accuracy of the estimated average weight of the 250 animals is much higher. In certain embodiments of the invention, this statistical precept has been applied to the averages of EPD. The accuracy of the average EPD of a group of animals is much higher than the accuracy of the EPD of the individual animals in the group. In certain embodiments of the invention, relative market value and genetic merit estimates of a sale group are not based on EPD and other predictive values for individual animals. Instead, data from and predictions for groups of animals are used. These resulting group predictions are far more accurate than individual predictions that are readily available in the industry.

Embodiments of the invention include utilizing mean EPD of the genetic merits of a group of animals and their relatives, instead of the EPD of individual animals or its ancestors. For example, in operations that involve multi-sire breeding, or in pastoral conditions where multi-sires are present, it is difficult to assign paternity. Therefore, instead of utilizing tests to determine the paternity of the sale group, it may be cost-effective to use mean EPD of the relatives associated with the sale group. Simulation models can associate the mean EPD values with economic factors and thus the model can directly project the relative market value of the sale group based on the mean EPD of the relatives. In other embodiments of the invention, the mean EPD of all possible parents of the sale group may be utilized to determine the relative market value of the sale group. In certain embodiments, the mean EPD of each genetic merit is utilized along with the variance of the EPD for the sale group to determine the relative market value. In certain embodiments of the invention, as one can predict the variability of a group's genetic merit estimates, and therefore, the variability of the relative market value of the sale group.

Current DNA-based calf valuation programs, such as that offered by Zoetis and AAA, estimate the genetic merits of an individual unregistered calf based directly on the calf's own DNA. In most cases, the sire of the calf is not identified. The predictions for DNA based differences are generally derived by utilizing the matrix of EPD and relationships for all animals in the database, which include the registered relatives of the calf. The specific EPD of relatives of the calves are typically not utilized in this calculation. Scores from these programs are not tied to current market prices or any specific relative market value. Further, these scores do not allow comparisons with animals of other breeds, or from other databases, or with a national average. Embodiments of the invention utilize EPD information on sires and on other relatives (i.e., maternal grandsires) and may include phenotype information on the animals themselves to determine relative market values. Embodiments of the invention allow for bundling the genetic prediction with a specific set of age and source verified calves. Embodiments of the invention predict dollar per pound predictions of the relative market value for a group of animals or the sale group.

A few examples of the genetic merits and genetic merit estimates are described below in greater detail. In certain embodiments of the invention, one or more of these EPD are used as genetic merit estimates in the computation models to derive a relative market value. In other embodiments of the invention, one or more of these EPD are used along with other real-time measurements in the computation models to derive a relative market value.

Embodiments of the present invention include utilizing Average Daily Gain as a genetic merit estimate for calculating a relative market value. For example, Average Daily Gain may be derived from EPD on post-weaning weight gain. Average Daily Gain EPD of an animal, expressed in pounds, predicts the difference in post-weaning weight gain between the weight gains of the progeny of such animal compared to the progeny of other animals. Analytical models used in the present invention may take into account Average Daily Gain EPD of the individual animal, or of the sale group, or of the relatives of the animal or sale group, or of combinations thereof.

Embodiments of the present invention include utilizing Carcass Weight as a genetic merit estimate for calculating a relative market value. Carcass Weight can be derived from Carcass Weight EPD of an animal or from a formula driven by weaning weight, post-weaning weight gain, ribeye area, marbling, back fat, and feed intake. Carcass Weight EPD, expressed in pounds, predicts the difference in carcass weight between the weights of the progeny of such animal compared to the progeny of other animals.

Embodiments of the present invention include utilizing Feed to Gain Ratio, Residual Average Daily Gain, Residual Feed Intake, and/or Feed Intake as genetic merit estimates for calculating a relative market value. Each of these genetic merit estimates predicts the amount of feed required by the animal to produce a pound of live weight. In addition, exemplary embodiments of the present invention utilize Feed Intake EPD to predict the amount of feed required to attain the predicted carcass weight. Analytical models used in the present invention may take into account Feed to Gain Ratio EPD of the relatives, and/or Feed to Gain Ratio by the individual animal or by the herd. Analytical models used in the present invention may take into account Residual Average Daily Gain EPD, Residual Feed Intake EPD, and Feed Intake EPD of the individual animals or the sale group, or the relatives, or any combinations thereof.

Embodiments of the present invention include utilizing Ribeye Area as a genetic merit estimate for calculating a relative market value. Ribeye Area EPD predicts the difference in square inches of the ribeye area of an animal's progeny compared to the progeny of other animals. Ribeye Area factors into the carcass yield grade equation that estimates the percentage of edible cuts that can be obtained from the carcass. Larger Ribeye Area EPD also predicts that the animal can be fed to a heavier carcass weight before yield grade discounts are applied.

Embodiments of the present invention include utilizing Yield Grade as a genetic merit estimate for calculating a relative market value. Yield Grade EPD is a prediction of the relative red meat yield of the carcass that is driven by carcass weight, fat, and ribeye area. A Yield Grade EPD is calculated for percent of retail product that can be produced by the progeny of the animal compared to the progeny of other animals.

Embodiments of the present invention include utilizing Marbling or Intramuscular Fat (IMF) as a genetic merit estimate for calculating a relative market value. Marbling EPD is expressed as a difference in USDA marbling score or a difference in the percentage of intramuscular fat. Marbling is a prediction of the USDA's score of the amount of intramuscular fat in the ribeye muscle of an animal's progeny compared to progeny of other animals. Higher marbling animals command carcass premiums.

Embodiments of the present invention include utilizing Percentage of Choice as a genetic merit estimate for calculating a relative market value. Percentage of Choice EPD is a prediction of the percentage of the carcass of an animal's progeny that will grade in USDA's choice or better carcass category, when compared to progeny of other animals. This genetic merit estimate may be driven by the Marbling EPD.

Embodiments of the present invention include utilizing the Weaning Weight as a genetic merit estimate for calculating a relative market value. Weaning Weight EPD is expressed in pounds and predicts the average differences in weight of an animal's progeny compared to progeny of other animals for a standard weaning age, usually at about 205 days. Analytical models used in the present invention may take into account Weaning Weight of the individual animal, or of the sale group, or of the relatives of the animal or sale group, or of combinations thereof.

Embodiments of the present invention include utilizing Animal Health as a genetic merit estimate for calculating a relative market value. Animal Health EPD can be calculated based on treatment and mortality rates in animals within a database. Analytical models used in the present invention may include Animal Health EPD of the individual animal, or of the sale group, or of the relatives of the animal or sale group, or of combinations thereof.

Embodiments of the present invention include utilizing Tenderness as a genetic merit estimate for calculating a relative market value. Tenderness EPD can be utilized to estimate carcass value as more tender beef is more valuable. Analytical models used in the present invention may include Tenderness EPD of the individual animal, or of the sale group, or of the relatives of the animal or sale group, or of combinations thereof.

Breeds consist of animals with a common origin and selection history. Animals within a breed have physical characteristics that distinguish them from other breeds or groups of animals within the same species. Breed differences exist due partly to natural and artificial selection pressures. A breed association is the organization that typically maintains pedigree and performance information and arranges for timely genetic evaluation of animals within that breed. Breed associations also establish regulations for registration of animals, promote the breed, and advance the interests of its members. Breed Effects are adjustment factors that allow comparison of EPD from differing breeds and/or different breed databases. Breed Effects include base adjustment factors which may be derived from proprietary databases (e.g., Leachman database) or from publicly available databases. An example of a publicly available database, are the across breed comparison charts that are provided by the United States Department of Agriculture (USDA) Agricultural Research Service. Certain embodiments of the invention utilize Breed Effects that include the variance of the EPD within a breed to rescale the EPD and aid in across breed and/or across database comparisons. Embodiments of the present invention include utilizing Breed Effects for standardizing genetic merit estimates from multiple breeds. These standardized genetic merit estimates are then used for calculating a relative market value.

Producer's bull battery is the historical inventory of bulls used in the herd. Embodiments of the present invention include utilizing a ten year history of all the bulls used in the herd. Bull identity is stored based on the bull's registration number and breed. Corresponding estimates of genetic merit are stored on each bull. This ancestral data is then used to estimate the relative market value of the corresponding sale groups.

Cowherd size is the approximate number of breeding age females kept in the herd. Embodiments of the present invention utilize the cowherd size to assess the bull battery inventory. A minimum percentage of bull battery inventory is required to produce the relative market value estimate for a sale group.

Embodiments of the present invention include estimating the genetic merit contribution of the dams of the sale group via genetic merit estimates on the older portion of the bull battery. In the event that females are purchased, the genetic merit of the dams cannot be estimated in this fashion and are then assumed to be either equal to industry average or to the breed average if breed of the dams can be accurately ascertained. Other embodiments of the present invention include utilizing genetic merit estimates for dams from their herd of origin in the same way that genetic merits are estimated for the sale groups.

Data about any measurement of the relatives' attributes or EPD of relatives are most useful for evaluating younger animals before performance and productivity measurements from the individual animals or their progeny are obtained. Pedigree information is also important for understanding genetic variability and its role in determining genetic merit. In certain embodiments of the invention, the EPD of relatives, for example that of the sires and maternal grandsires, are the only genetic merit estimates used in determining the relative market value of a sale group. Simulation models can associate the EPD values with economic factors and thus the model can directly project the relative market value based on the EPD alone. The genetic merit estimates may include the EPD of only one parent, for example the sire.

Genetic merits affect the expense in raising the sale group and the income derived from it. A simulation model has been developed that provides appropriate bio-economic weights to these genetic merit estimates in estimating the relative value of the sale group. The economic weighting factors thus derived are applied to every EPD that a user inputs using the genetic merit scorecard system. These economic weighting factors are derived utilizing current assumptions for the changing real world prices for cattle and feed, labor, interest, and health costs, and other costs associated with livestock health and environment.

In an embodiment of the genetic merit scorecard system, the relative market value is determined using a plurality of information associated with the sale group. The plurality of information associated with the sale group include at least one of the following: genetic merit estimates associated with the sale group, performance information of the sale group, performance information from a contemporary group, environmental conditions, management information, and nutritional information. Performance information associated with an animal or a plurality of animals includes reproductive performance metrics, production performance metrics, and economic performance metrics of the animal or the plurality of animals, as the term is known and understood by those skilled in the art. In certain embodiments, genetic merit estimates associated with the sale group are mean EPD values for the relatives of the sale group, instead of individual EPD values. In certain embodiments of the invention, a herd average is used to determine the relative market value for commercial customers' calves. In another embodiment, the sale group may be composed of animals registered with the breed association or of unregistered progeny of these animals.

In certain embodiments, the relative market value is determined based on the genetic merit estimates, for example feed intake, feed to gain, residual feed intake, and residual average daily gain, which are all proxies for this trait. Existing systems value the output and make standard cost assumptions on the feed intake. Embodiments of the invention take into account specific EPD for intake on the relatives of the sale group. Thus, these embodiments of the genetic merit scorecard system offer better prediction of likely feeding costs, and a more accurate prediction of relative market value for the sale group.

In another embodiment of the genetic merit scorecard system, the system allows for a user to access the previously determined relative market value of a sale group. This user can then input one or more changes in the plurality of genetic merit estimates and determine a revised relative market value for the sale group. This revised relative market value is then reflected on a revised genetic merit scorecard. A user could input other information obtained from an animal or the sale group such as the associated environmental conditions, performance information, management information, nutritional information, or combinations thereof.

In another embodiment of the genetic merit scorecard system, the system allows for a user to input information from a particular buyer of the sale group. The information is associated to a particular buyer and includes specific environmental conditions, market conditions, management information, nutritional information, or combinations thereof.

Various embodiments of the present invention advantageously provide systems, machines, non-transitory computer medium having computer program instructions stored thereon, and computer-implemented methods for determining relative market value of a sale group.

FIG. 1 is an illustration of an exemplary embodiment of the computer-implemented methods of the invention. In one embodiment, the method utilizes 11 a variety of genetic merit estimate inputs, including, but not limited to, EPD values for genetic merits from an animal, a plurality of animals, or their relatives, and/or performance information from an individual animal, or from its contemporary group, or its relatives. The set of animals, whose relative market value is determined, is referred to as the sale group. The method may also utilize genetic merit estimates derived from DNA analysis of the sale group or its relatives. DNA analysis involves obtaining information from the genetic material from any type of cell or tissue of an individual animal, or a sale group, or of its contemporary group, or its relatives. Economic weighting factors are calculated 12 using market values associated to each of the above input factors. Market values can include historical sales values, sales projection data, and real-time market values for animals, carcasses, and operational expenses, like feed, labor, interest, and health. Then utilizing all relevant genetic merit estimates and associated economic weighting factors, analytical models are assembled 13 to derive linear and/or non-linear associations. The analytical model, for example, may include, but is not limited to, a multivariate regression analysis that fits the various genetic merit estimates in linear and non-linear forms against the economic weighting factors derived from a simulation model. Using these models, a relative market value is determined 14 for a sale group. In an embodiment, one can also generate 15 a genetic merit scorecard for the sale group based on the relative market value and the genetic merit estimates. Such a genetic merit scorecard may contain a relative market value along with a star ranking of the genetic merits of the sale group on a percentile basis. An example of a genetic merit scorecard 65 is provided in FIG. 6.

The relative market value may be expressed in various ways. In one embodiment, the relative market value is a difference in market value per head of a sale group compared to the market value of a sale group that represents the average progeny of all registered bulls in the country or market region. In another embodiment, the relative market value is a difference in market value per centum weight of the sale group compared to the market value per centum of a sale group that represents the average progeny of all registered bulls in the country or market region. The national average is estimated by calculating the average EPD for each breed by year. These EPD are then input into the linear estimation models to estimate relative market values for progeny by all registered bulls within each breed. Then the relative market values are combined into a single national average based on each breed's contribution to the total number of registered bulls in the country.

Figure 2:
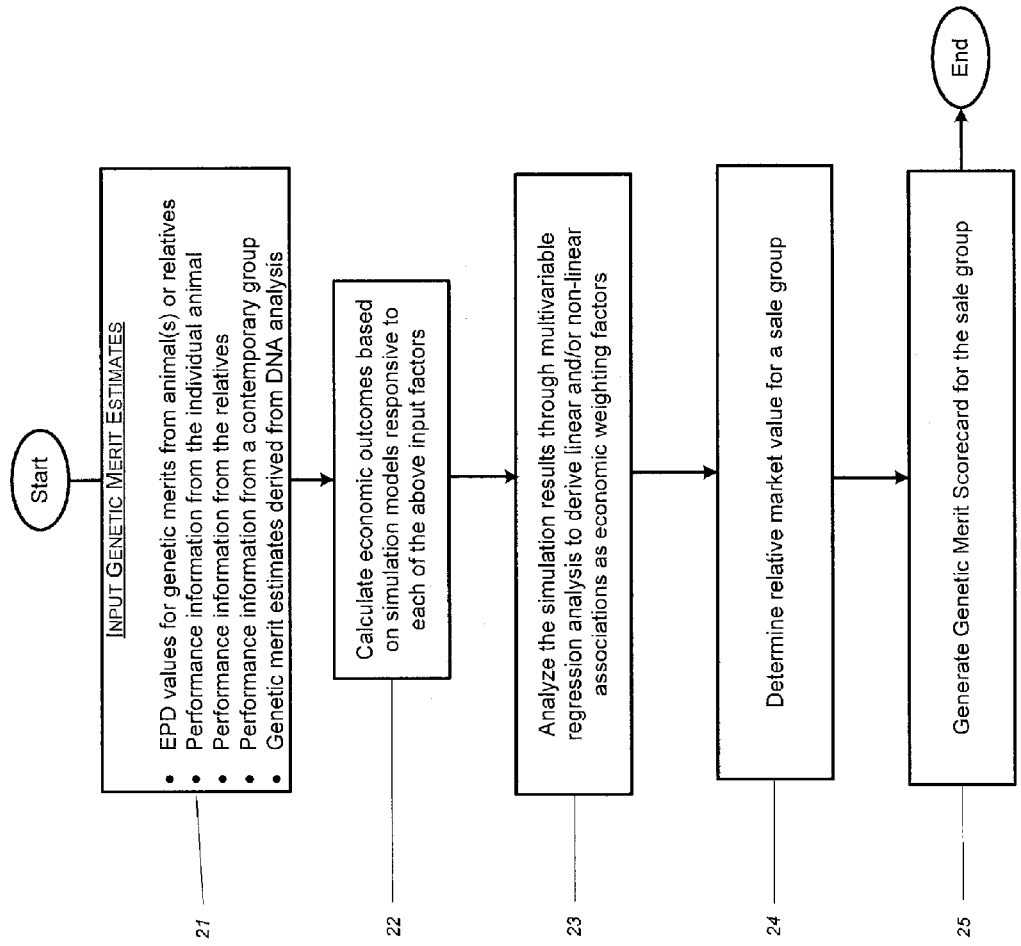
FIG. 2 is a schematic block diagram of another exemplary computer implemented method to determine the relative market value of a sale group.

FIG. 2 is an illustration of another exemplary embodiment of the computer-implemented methods of the invention. In this embodiment, inputs 21 of various genetic merit estimates are used, including but not limited to, EPD values for genetic merits from an animal, a plurality of animals, or their relatives, and/or performance information from an individual animal, or from its contemporary group, or its relatives. In an embodiment, the EPD values used are mean EPD values for the sale group. The method may also utilize genetic merit estimates derived from DNA analysis. DNA analysis involves obtaining information from the genetic material from any type of cell or tissue of an individual animal, or a sale group, or of its contemporary group, or its relatives. Economic outcomes are calculated 22 based on simulation models that utilize each of the above input factors. The simulation results are analyzed using multivariate regression analysis to derive linear and/or non-linear associations such as economic weighting factors 23. Relative market value for a sale group is determined 24. In an embodiment, one can also generate 25 a genetic merit scorecard for a sale group based on the relative market value and the genetic merit estimates. Such a genetic merit scorecard may contain a relative market value along with a star ranking of the genetic merits of the animals on a percentile basis. An example of a genetic merit scorecard 65 is provided in FIG. 6.

In certain embodiments, the current and historical data from the genetic merit database provides a series of data points, each of which is defined by one or more input variables, or genetic merit estimates, and one or more outputs, such as economic values. The inputs include genetic merit estimates of any of the following: average daily gain, carcass weight, marbling, back fat thickness, feed to gain ratio, ribeye area, yield grade, tenderness, percentage of choice, pedigree, breed effects, feed intake, animal health, weaning weight, post weaning weight gain, maintenance energy, maternal merit, birth weight, or residual feed intake, residual average daily gain, or any linear or non-linear combination of any two or more of these traits. In certain embodiments, the independent variables may include a limited set of genetic merit estimates of feed intake, weaning weight, post-weaning weight gain, carcass weight, marbling, ribeye area, and back fat thickness. A regression analysis is performed on the data points to determine the relationship between the genetic merit estimates and the economic values. The multiple regression analysis produces an equation with a constant term $\alpha$, and a plurality of subsequent terms. Except for the constant term, the nth term of the equation may begin with a non-zero coefficient $\beta$ number n−1 and may include either a single input variable of any degree or the product of two or more input variables of any degrees.

The regression can be linear or non-linear. In an embodiment of the invention, the regression is non-linear. This embodiment allows the regression analysis to produce broader results because the terms of the resulting equation to calculate the relative market value will not be restricted to having a degree of one. The broader range of possible results increases the likelihood that the derived result will correlate closely to the data points from the genetic merit database.

An example of a model developed using the computer-implemented methods of an embodiment of this invention is described below in the form of an equation:

$$\text{Relative market value} = \alpha + (\beta 1 \times \text{Weaning EPD}) + (\beta 2 \times \text{Post Weaning Gain EPD}) + (\beta 3 \times \text{Post Weaning Gain EPD squared}) + (\beta 4 \times \text{Marbling EPD}) + (\beta 5 \times \text{Marbling EPD squared}) + (\beta 6 \times \text{Ribeye Area EPD}) + (\beta 7 \times \text{Fat EPD}) + (\beta 8 \times \text{Carcass Weight EPD}) + (\beta 9 \times \text{Feed Intake EPD}) + (\beta 10 \times \text{Breed effect})$$

In this equation, $\alpha$ is the intercept while the $\beta$s represent economic weighting factors associated with each of the specific EPD values.

TABLE 1

Relative Market Value Prediction per Head

| Genetic Merit Estimate (EPD name) | Economic Weighting Factor | Expected Progeny Difference Value | Partial solution |
|---|---|---|---|
| Intercept | −54.63230595 | | −54.63230595 |
| Ribeye Area | 18.83628065 | 0.225 | 4.238163145 |
| Marbling | 70.15643278 | 0.37 | 25.95788013 |
| Fat | −365.0592968 | 0.004 | −1.460237187 |
| Weaning weight | 0.698390155 | 38.5 | 26.88802097 |
| PostW_gain_epd | 3.203660424 | 33.25 | 106.5217091 |
| Breed adjustment | 0 | 0 | 0 |
| Carcass weight | 0 | 0 | 0 |
| PostW_gain _epd2 | −0.033147268 | 1107.25 | −36.70231265 |
| Marbling2 | −43.68630945 | 0.13775 | −6.017789127 |
| | | Relative Market Value per head | $64.79 |

Table 1 is a non-limiting example of how the relative market value of a sale group can be determined using the various genetic merit estimates expressed as the EPD and their associated economic weighting factors. In this example, the set of calves out of the ancestor (whose genetic estimates are in column 3) would have a relative market value of $64.79/head. If the calves weighed 500 lbs., the relative market value can be also expressed as $12.98 per cwt. (hundred weight) or $0.1298 per pound.

Figure 3A:
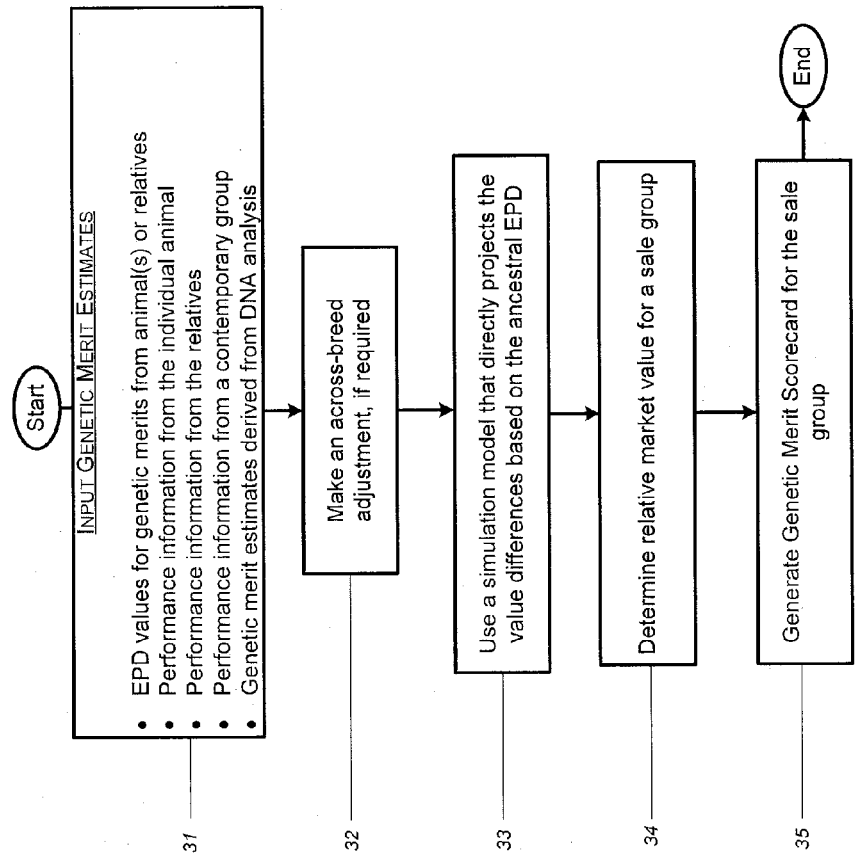
FIG. 3A is a schematic block diagram of another exemplary computer implemented method to determine the relative market value of a sale group.

FIG. 3A is an illustration of another exemplary embodiment of the computer-implemented methods of the invention. In this embodiment, inputs 31 of a variety of genetic merit estimate inputs are used, including but not limited to, EPD values for genetic merits from an animal, a plurality of animals, or their relatives, and/or performance information from an individual animal, or from its contemporary group, or its relatives. The method may also utilize genetic merit estimates derived from DNA analysis of the sale group. If required, an across-breed adjustment is made 32. A simulation model is used 33 that directly projects the value differences based on the ancestral EPD. The relative market value for the sale group is determined 34. In an embodiment, one can also generate 35 a genetic merit scorecard based on the relative market value and the genetic merit estimates. Such genetic merit scorecard may contain a relative market value of the sale group along with a star ranking of the genetic merits of the animals on a percentile basis. An example of a genetic merit scorecard 65 is provided in FIG. 6.

Figure 3B:
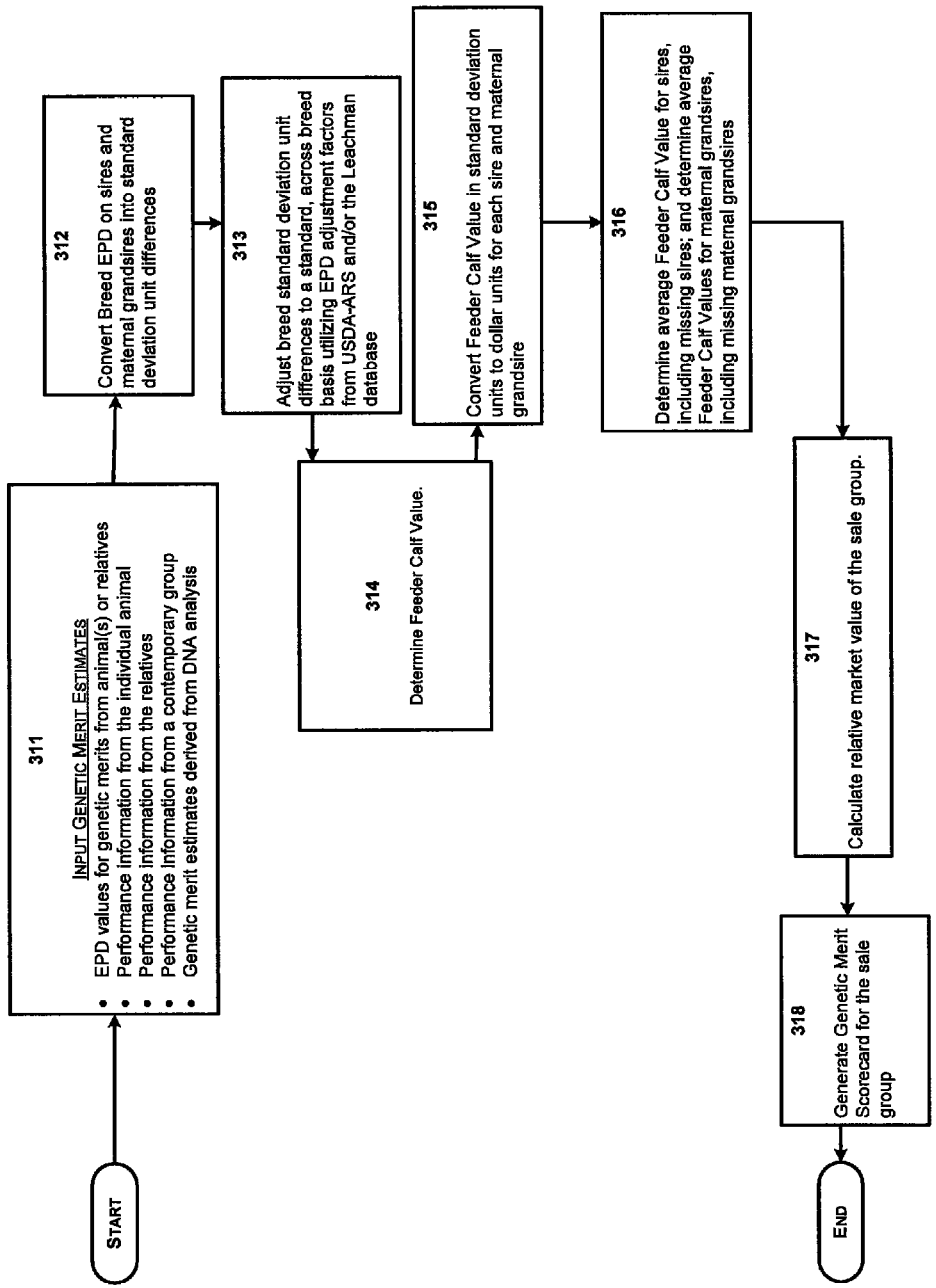
FIG. 3B is a schematic block diagram of another exemplary computer implemented method to determine the relative market value of a sale group.

FIG. 3B is an illustration of another exemplary embodiment of the computer-implemented methods of the invention and is described below.

In this embodiment, a variety of genetic merit estimates 311 are inputted, including but not limited to, EPD values for genetic merits from an animal, a plurality of animals, or their relatives, and/or performance information from an individual animal, or from its contemporary group, or its relatives. First, Breed EPD on sires and maternal grand sires 312 are converted into standard deviation unit differences. Then, Breed standard deviation unit differences 313 are adjusted to a standard, across breed basis utilizing EPD adjustment factors from USDA-ARS, the Leachman database, and/or other EPD databases.

A regression analysis is performed using the standard deviation units for each trait to determine 314 the feeder calf value. Note that in some cases, not all EPD are available on sires and grandsires. In such cases, the coefficients for the input variables change due to correlated responses between missing traits and available traits. The feeder calf value is a value assigned to ancestors (like sires and maternal grandsires), and is a projection of the value of offspring of the animal. The feeder calf value for a sire predicts the value of the sire's offspring. The feeder calf value in standard deviation units 315 is then converted to dollar units for each sire and maternal grandsire. Missing feeder calf values for sires and grandsires are assigned to appropriate population averages. The feeder calf value in dollars for sires, including missing sires, is averaged 316. The feeder calf value for maternal grandsires, including missing maternal grandsires, is averaged 316. The relative market value of the sale group 317 is calculated based on the feeder calf value of the sires and the grandsires. In an embodiment, one can also generate 318 a genetic merit scorecard based on the relative market value and the genetic merit estimates. Such a genetic merit scorecard may contain a relative market value of the sale group along with a star ranking of the genetic merits of the animals on a percentile basis. An example of a genetic merit scorecard 65 is provided in FIG. 6.

Figure 3C:
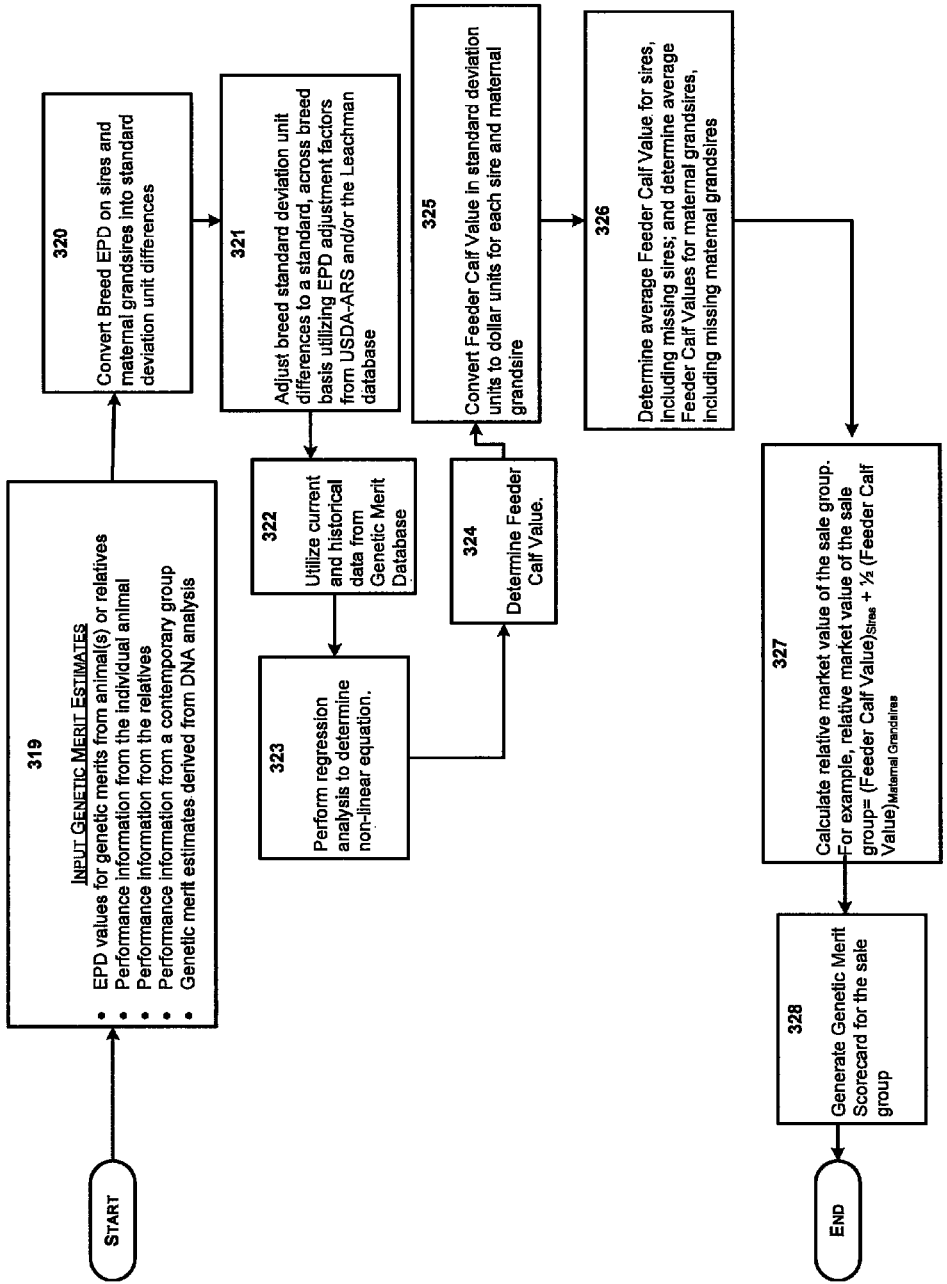
FIG. 3C is a schematic block diagram of another exemplary computer implemented method to determine the relative market value of a sale group.

FIG. 3C is an illustration of another exemplary embodiment of the computer-implemented methods of the invention, and is described below.

In this embodiment, a variety of genetic merit estimates 319 are inputted, including but not limited to, EPD values for genetic merits from an animal, a plurality of animals, or their relatives, and/or performance information from an individual animal, or from its contemporary group, or its relatives. First, Breed EPD on sires and maternal grandsires 320 are converted into standard deviation unit differences. Then, Breed standard deviation unit differences 321 are adjusted to a standard, across breed basis utilizing EPD adjustment factors from USDA-ARS, the Leachman database, and/or other EPD databases. Utilizing 322 current and historical data from the genetic merit database, a regression analysis is performed 323 using the standard deviation units for each trait to determine 324 the feeder calf value. Note that in some cases, not all EPD are available on sires and grandsires. In such cases, the coefficients for the input variables change due to correlated responses between missing traits and available traits. The feeder calf value in standard deviation units 325 is then converted to dollar units for each sire and maternal grandsire. Missing feeder calf values for sires and grandsires are assigned to appropriate population averages. The feeder calf value in dollars for sires, including missing sires, is averaged 326. The feeder calf value for maternal grandsires, including missing maternal grandsires, is averaged 326. The relative market value of the sale group 327 is calculated based on the feeder calf value of the sires and the grandsires.

In a certain embodiment, relative market value of the sale group is calculated using the following formula:

$$\text{Relative market value of the sale group} = (\text{Feeder Calf Value})_{Sires} + \tfrac{1}{2}(\text{Feeder Calf Value})_{Maternal\ Grandsires}.$$

In an embodiment, one can also generate 328 a genetic merit scorecard based on the relative market value and the genetic merit estimates. Such genetic merit scorecard may contain a relative market value of the sale group along with a star ranking of the genetic merits of the animals on a percentile basis. An example of a genetic merit scorecard 65 is provided in FIG. 6.

Figure 3D:
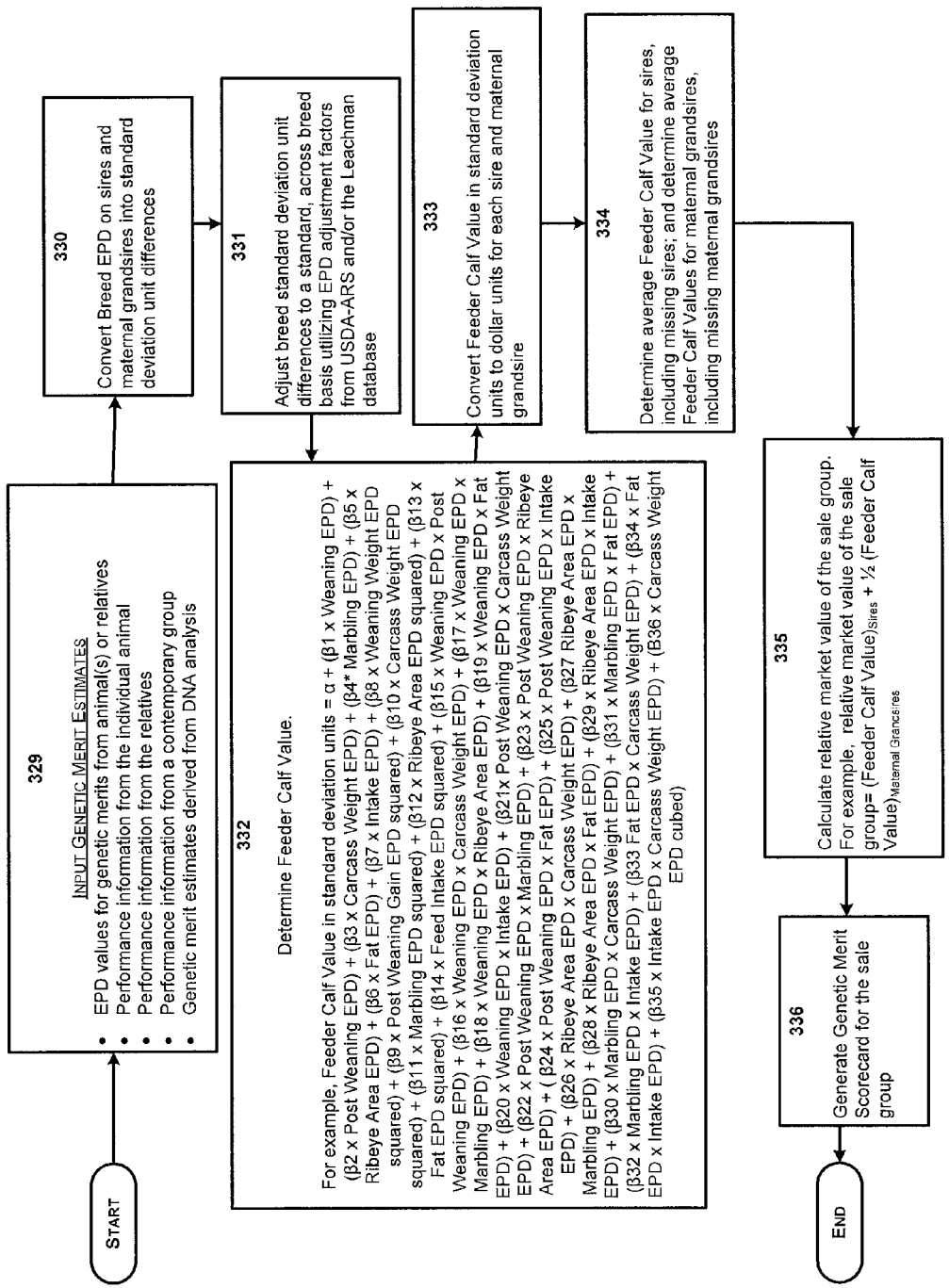
FIG. 3D is a schematic block diagram of another exemplary computer implemented method to determine the relative market value of a sale group.

FIG. 3D is an illustration of another exemplary embodiment of the computer-implemented methods of the invention, and is described below.

In this embodiment, a variety of genetic merit estimates 329 are inputted, including but not limited to, EPD values for genetic merits from an animal, a plurality of animals, or their relatives, and/or performance information from an individual animal, or from its contemporary group, or its relatives. First, Breed EPD on sires and maternal grandsires 330 are converted into standard deviation unit differences. Then, Breed standard deviation unit differences 331 are adjusted to a standard, across breed basis utilizing EPD adjustment factors from USDA-ARS, the Leachman database, and/or other EPD databases. In an embodiment, current and historical data from the genetic merit database are used in a regression analysis to determine 332 the feeder calf value.

The following equation is determined 332 and then applied to standard deviation units for each trait:

$$\begin{aligned}\text{Feeder Calf Value in standard deviation units} = &\ \alpha + (\beta 1 \times \text{Weaning EPD}) + (\beta 2 \times \text{Post Weaning EPD}) + (\beta 3 \times \text{Carcass Weight EPD}) + (\beta 4 \times \text{Marbling EPD}) + (\beta 5 \times \text{Ribeye Area EPD}) + (\beta 6 \times \text{Fat EPD}) + (\beta 7 \times \text{Intake EPD}) + (\beta 8 \times \text{Weaning Weight EPD squared}) + (\beta 9 \times \text{Post Weaning Gain EPD squared}) + (\beta 10 \times \text{Carcass Weight EPD squared}) + (\beta 11 \times \text{Marbling EPD squared}) + (\beta 12 \times \text{Ribeye Area EPD squared}) + \end{aligned}$$

($\beta$13×Fat EPD squared)+($\beta$14×Feed Intake EPD squared)+($\beta$15×Weaning EPD×Post Weaning EPD)+($\beta$16×Weaning EPD×Carcass Weight EPD)+($\beta$17×Weaning EPD×Marbling EPD)+($\beta$18×Weaning EPD×Ribeye Area EPD)+($\beta$19×Weaning EPD×Fat EPD)+($\beta$20×Weaning EPD×Intake EPD)+($\beta$21×Post Weaning EPD×Carcass Weight EPD)+($\beta$22×Post Weaning EPD×Marbling EPD)+($\beta$23×Post Weaning EPD×Ribeye Area EPD)+($\beta$24×Post Weaning EPD×Fat EPD)+($\beta$25×Post Weaning EPD×Intake EPD)+($\beta$26×Ribeye Area EPD×Carcass Weight EPD)+($\beta$27 Ribeye Area EPD×Marbling EPD)+($\beta$28×Ribeye Area EPD×Fat EPD)+($\beta$29×Ribeye Area EPD×Intake EPD)+($\beta$30×Marbling EPD×Carcass Weight EPD)+($\beta$31×Marbling EPD×Fat EPD)+($\beta$32×Marbling EPD×Intake EPD)+($\beta$33 Fat EPD×Carcass Weight EPD)+($\beta$4×Fat EPD×Intake EPD)+($\beta$35×Intake EPD×Carcass Weight EPD)+($\beta$36×Carcass Weight EPD cubed)

| | | Coefficients for Equation |
|---|---|---|
| α | (Intercept) | 0.051200 |
| β1 | SdWW | −0.179 |
| β2 | SdPWG | 0.07603 |
| β3 | SdCWT | 0.9583 |
| β4 | SdMarb | 0.5673 |
| β5 | SdREA | 0.2191 |
| β6 | SdBF | 1.535 |
| β7 | SdInt | −0.1618 |
| β8 | SDWW2 | −0.0183 |
| β9 | SDPWG2 | 0.175 |
| β10 | SDCWT2 | 0.05376 |
| β11 | SDIMF2 | 0.002981 |
| β12 | SDREA2 | 0.004488 |
| β13 | SDBF2 | 0.2591 |
| β14 | SDINT2 | 0.002199 |
| β15 | WWxPWG | 0.04432 |
| β16 | WWxCWT | −0.0183 |
| β17 | WWxMarb | −0.02093 |
| β18 | WWxREA | −0.03006 |
| β19 | WWxBF | −0.006867 |
| β20 | WWxInt | 0.02907 |
| β21 | PWGxCWT | −0.2192 |
| β22 | PWGxMarb | −0.0904 |
| β23 | PWGxREA | −0.05858 |
| β24 | PWGxBF | −0.3929 |
| β25 | PWGxInt | 0.04765 |
| β26 | REAxCWT | 0.04621 |
| β27 | REAxIMF | 0.02275 |
| β28 | REAxBF | 0.08042 |
| β29 | REAxInt | −0.006367 |
| β30 | MarbxCWT | 0.04614 |
| β31 | MarbxBF | 0.09427 |
| β32 | MarbxInt | −0.002338 |
| β33 | BFxCWT | 0.2655 |
| β34 | BFxInt | −0.06213 |
| β35 | IntxCWT | −0.02418 |
| β36 | SdCWT3 | −0.003442 |

Note that in some cases, not all EPD are available on sires and grandsires. In such cases, the coefficients for the input variables change due to correlated responses between missing traits and available traits. The feeder calf value in standard deviation units 333 is then converted to dollar units for each sire and maternal grandsire. Missing feeder calf values for sires and grandsires are assigned to appropriate population averages. The feeder calf value in dollars for sires, including missing sires, is averaged 334. The feeder calf value for maternal grandsires, including missing maternal grandsires, is averaged 334. The relative market value of the sale group 335 is calculated based on the feeder calf value of the sires and the grandsires.

In a certain embodiment, relative market value of the sale group is calculated using the following formula:

Relative market value of the sale group=(Feeder Calf Value)$_{Sires}$+½(Feeder Calf Value)$_{Maternal\ Grandsires}$.

In certain embodiment, one can also generate 336 a genetic merit scorecard based on the relative market value and the genetic merit estimates. Such a genetic merit scorecard may contain a relative market value of the sale group along with a star ranking of the genetic merits of the animals on a percentile basis. An example of a genetic merit scorecard 65 is provided in FIG. 6.

Figure 3E:
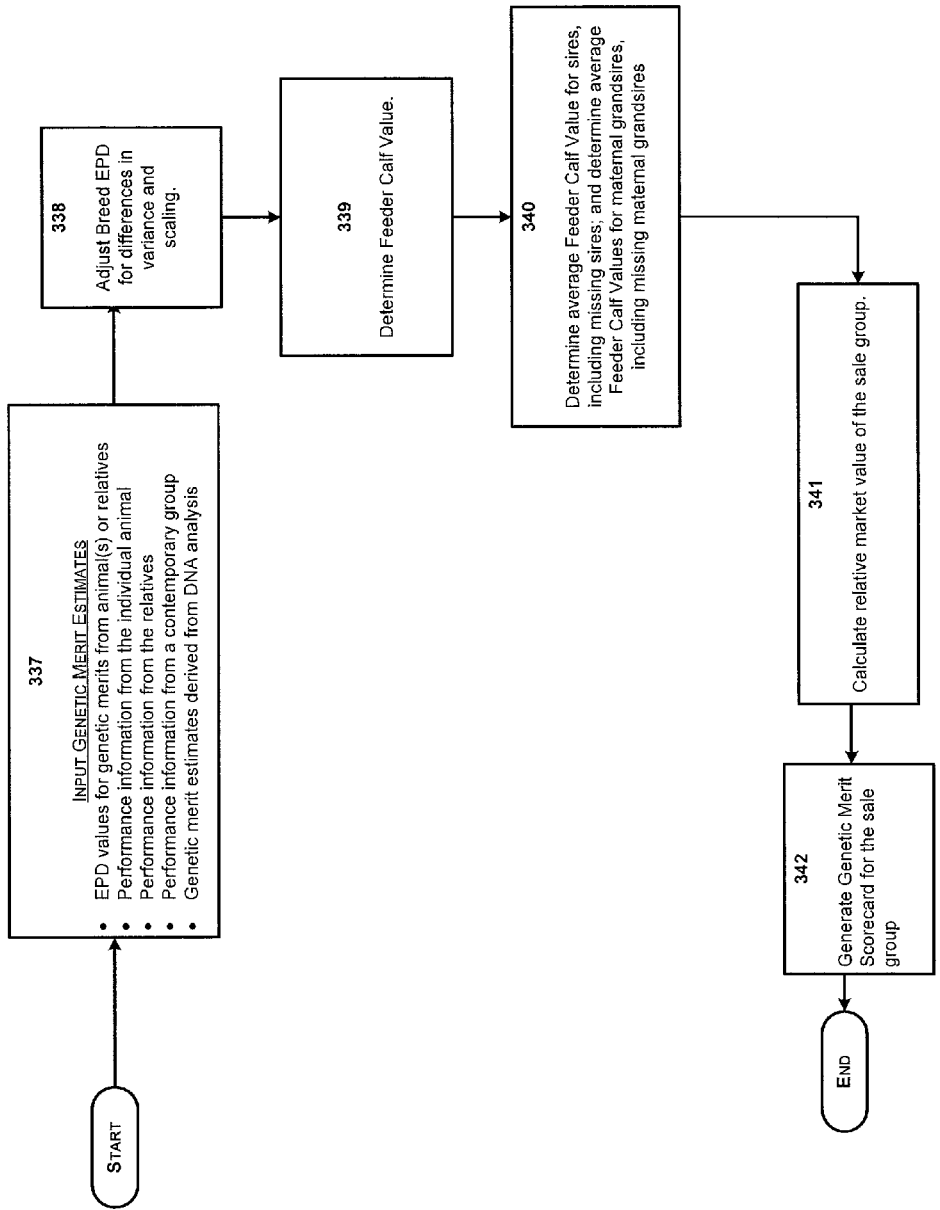
FIG. 3E is a schematic block diagram of another exemplary computer implemented method to determine the relative market value of a sale group.

FIG. 3E is an illustration of another exemplary embodiment of the computer-implemented methods of the invention, and is described below.

In this embodiment, a variety of genetic merit estimates 337 are inputted, including but not limited to, EPD values for genetic merits from an animal, a plurality of animals, or their relatives, and/or performance information from an individual animal, or from its contemporary group, or its relatives. Breed EPD on sires and maternal grandsires 338 are adjusted for differences in variances and scaling. EPD adjustment factors from USDA-ARS, the Leachman database, and/or other EPD databases may be utilized.

A regression analysis is performed to determine 339 the feeder calf value. Note that in some cases, not all EPD are available on sires and grandsires. In such cases, the coefficients for the input variables change due to correlated responses between missing traits and available traits. Missing feeder calf values for sires and grandsires are assigned to appropriate population averages. The feeder calf value in dollars for sires, including missing sires, is averaged 340. The feeder calf value for maternal grandsires, including missing maternal grandsires, is averaged 340. The relative market value of the sale group 341 is calculated based on the feeder calf value of the sires and the grandsires. In an embodiment, one can also generate 342 a genetic merit scorecard based on the relative market value and the genetic merit estimates. Such a genetic merit scorecard may contain a relative market value of the sale group along with a star ranking of the genetic merits of the animals on a percentile basis. An example of a genetic merit scorecard 65 is provided in FIG. 6.

Figure 3F:
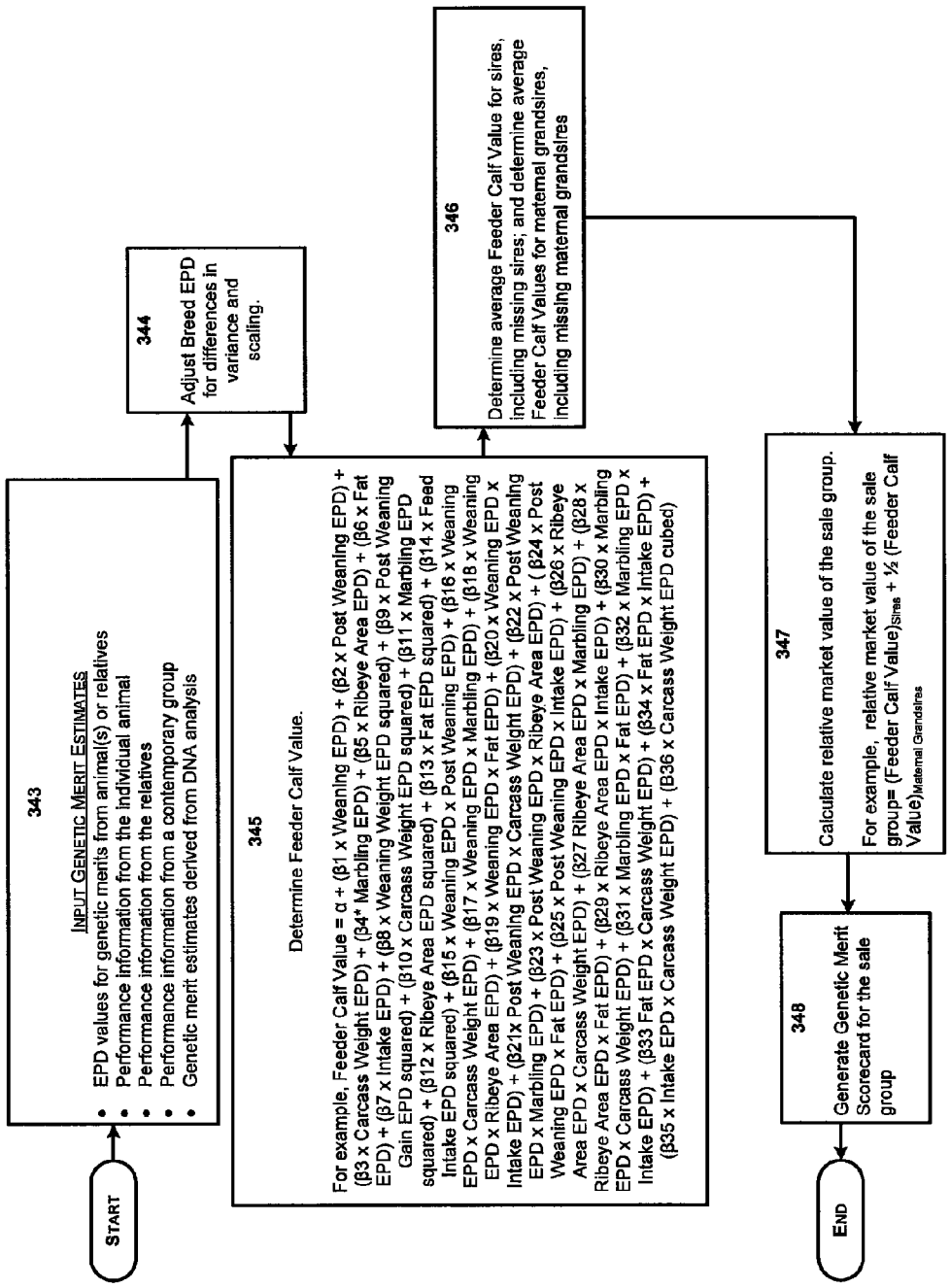
FIG. 3F is a schematic block diagram of another exemplary computer implemented method to determine the relative market value of a sale group.

FIG. 3F is an illustration of another exemplary embodiment of the computer-implemented methods of the invention, and is described below.

In this embodiment, a variety of genetic merit estimates 343 are inputted, including but not limited to, EPD values for genetic merits from an animal, a plurality of animals, or their relatives, and/or performance information from an individual animal, or from its contemporary group, or its relatives. Breed EPD on sires and maternal grandsires 344 are adjusted for differences in variances and scaling. EPD adjustment factors from USDA-ARS, the Leachman database, and/or other EPD databases may be utilized.

A regression analysis is performed to determine 345 the feeder calf value. The following equation is determined 345:

Relative market value=α+($\beta$1×Weaning EPD)+($\beta$2×Post Weaning EPD)+($\beta$3×Carcass Weight EPD)+($\beta$4*Marbling EPD)+($\beta$5×Ribeye Area EPD)+($\beta$6×Fat EPD)+($\beta$7×Intake EPD)+($\beta$8×Weaning Weight EPD squared)+($\beta$9×Post Weaning Gain EPD squared)+($\beta$10×Carcass Weight EPD squared)+($\beta$11×Marbling EPD squared)+($\beta$12×Ribeye Area EPD squared)+($\beta$13×Fat EPD squared)+($\beta$14×Feed Intake EPD squared)+($\beta$15×Weaning EPD×Post Weaning EPD)+($\beta$16×Weaning EPD×Carcass Weight EPD)+($\beta$17×Weaning EPD×Marbling EPD)+($\beta$18×Weaning EPD×Ribeye Area EPD)+($\beta$19×Weaning EPD×Fat EPD)+($\beta$20×Weaning EPD×Intake EPD)+($\beta$21×Post Weaning EPD×Carcass Weight EPD)+

(β22×Post Weaning EPD×Marbling EPD)+(β23×Post Weaning EPD×Ribeye Area EPD)+(β24×Post Weaning EPD×Fat EPD)+(β25×Post Weaning EPD×Intake EPD)+(β26×Ribeye Area EPD×Carcass Weight EPD)+(β27 Ribeye Area EPD×Marbling EPD)+(β28×Ribeye Area EPD×Fat EPD)+(β29×Ribeye Area EPD×Intake EPD)+(β30×Marbling EPD×Carcass Weight EPD)+(β31×Marbling EPD×Fat EPD)+(β32×Marbling EPD×Intake EPD)+(β33 Fat EPD×Carcass Weight EPD)+(β34×Fat EPD×Intake EPD)+(β35×Intake EPD×Carcass Weight EPD)+(B36×Carcass Weight EPD cubed)

|     |            | Coefficients for Equation |
| --- | ---------- | ------------------------- |
| α   | (Intercept)| 0.051200                  |
| β1  | SdWW       | −0.179                    |
| β2  | SdPWG      | 0.07603                   |
| β3  | SdCWT      | 0.9583                    |
| β4  | SdMarb     | 0.5673                    |
| β5  | SdREA      | 0.2191                    |
| β6  | SdBF       | 1.535                     |
| β7  | SdInt      | −0.1618                   |
| β8  | SDWW2      | −0.0183                   |
| β9  | SDPWG2     | 0.175                     |
| β10 | SDCWT2     | 0.05376                   |
| β11 | SDIMF2     | 0.002981                  |
| β12 | SDREA2     | 0.004488                  |
| β13 | SDBF2      | 0.2591                    |
| β14 | SDINT2     | 0.002199                  |
| β15 | WWxPWG     | 0.04432                   |
| β16 | WWxCWT     | −0.0183                   |
| β17 | WWxMarb    | −0.02093                  |
| β18 | WWxREA     | −0.03006                  |
| β19 | WWxBF      | −0.006867                 |
| β20 | WWxInt     | 0.02907                   |
| β21 | PWGxCWT    | −0.2192                   |
| β22 | PWGxMarb   | −0.0904                   |
| β23 | PWGxREA    | −0.05858                  |
| β24 | PWGxBF     | −0.3929                   |
| β25 | PWGxInt    | 0.04765                   |
| β26 | REAxCWT    | 0.04621                   |
| β27 | REAxIMF    | 0.02275                   |
| β28 | REAxBF     | 0.08042                   |
| β29 | REAxInt    | −0.006367                 |
| β30 | MarbxCWT   | 0.04614                   |
| β31 | MarbxBF    | 0.09427                   |
| β32 | MarbxInt   | −0.002338                 |
| β33 | BFxCWT     | 0.2655                    |
| β34 | BFxInt     | −0.06213                  |
| β35 | IntxCWT    | −0.02418                  |
| β36 | SdCWT3     | −0.003442                 |

Note that in some cases, not all EPD are available on sires and grandsires. In such cases, the coefficients for the input variables change due to correlated responses between missing traits and available traits. Missing feeder calf values for sires and grandsires are assigned to appropriate population averages. The feeder calf value in dollars for sires, including missing sires, is averaged 346. The feeder calf value for maternal grandsires, including missing maternal grandsires, is averaged 346. The relative market value of the sale group 347 is calculated based on the feeder calf value of the sires and the grandsires. In a certain embodiment, relative market value of the Feeder Calf sale group is calculated using the following formula:

Relative market value of the Feeder Calf sale group=
(Feeder Calf Value)$_{Sires}$+½(Feeder Calf Value)$_{Maternal\ Grandsires}$ In an embodiment, one can also generate 348 a genetic merit scorecard based on the relative market value and the genetic merit estimates. Such a genetic merit scorecard may contain a relative market value of the sale group along with a star ranking of the genetic merits of the animals on a percentile basis. An example of a genetic merit scorecard 65 is provided in FIG. 6.

By way of example, an embodiment of the present invention can include a computer-implemented method to determine a national average market value of an animal or a plurality of animals, based on genetic merits. A reported number of potential sires registered by each breed by year of birth and average Expected Progeny Differences for all potential sires of each such year are obtained from a database. Then, the within breed Expected Progeny Differences are adjusted using breed factors that account for scaling and base differences between breeds. Economic weighting factors based on simulation models are applied to the adjusted Expected Progeny Differences. Values for non-reported breeds are estimated based on information obtained from breeds with similar biological characteristics. The national average market value is determined by allocating proportional contribution of each breed as a percentage of the total number of potential sires registered. This national average market value is the base to which all relative market values are compared.

Furthermore, the systems, computer-readable program product, and related computer-implemented methods to generate a genetic merit scorecard according to exemplary embodiments of the present invention, and as discussed above, can be implemented using one or more computers, one or more servers, one or more databases, and one or more communications networks. The systems, according to exemplary embodiments of the invention, are perhaps best illustrated by FIGS. 4-9.

Figure 4A:
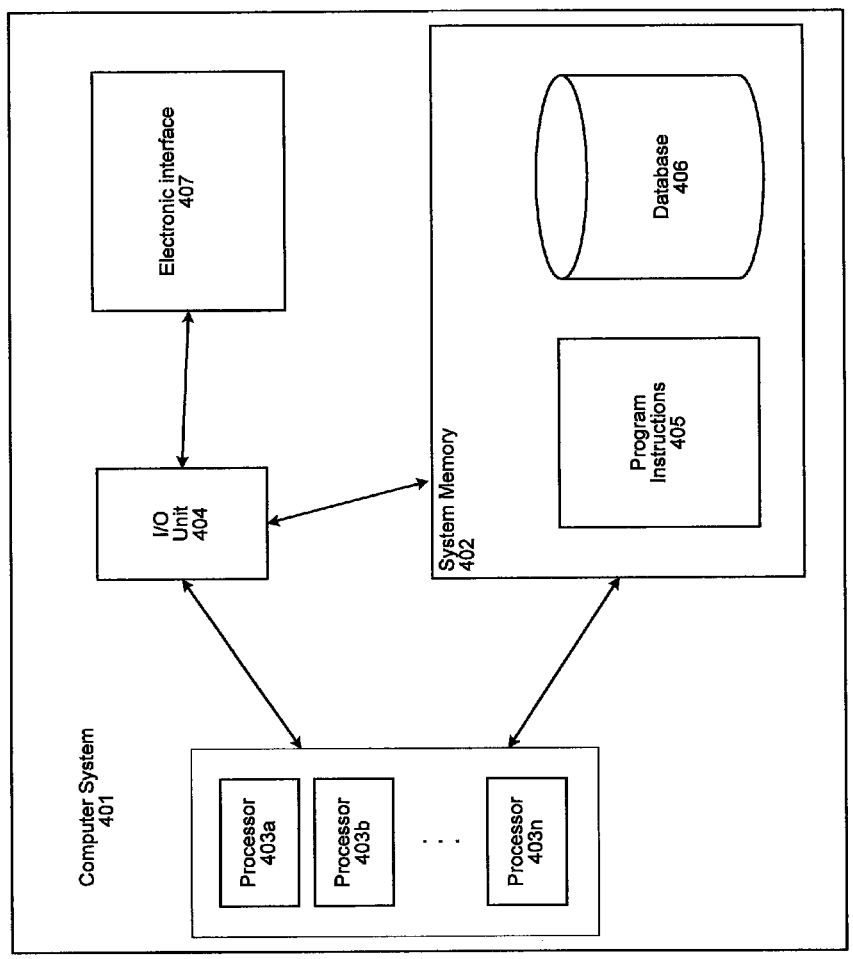
FIG. 4A is a block diagram that illustrates an exemplary computer system in accordance with one or more embodiments of the present invention.

Exemplary embodiments of the present invention include an online genetic merit scorecard system, as illustrated by using an example in FIG. 4A. An online system indicates that the system is accessible to a user over a network and may encompass accessibility through data networks, including but not limited to the internet, intranets, private networks or dedicated channels. This online genetic merit scorecard system 401 includes one or more processors 403a-403n, an input/output unit 404 adapted to be in communication with the one or more processors, one or more genetic merit databases 406 in communication with the one or more processors to store and associate a plurality of genetic merit estimates with a plurality of economic weighting factors, one or more electronic interfaces 407 positioned to display an online genetic merit scorecard and defining one or more genetic merit interfaces, and non-transitory computer-readable medium 402. The non-transitory computer-readable medium is positioned in communication with the one or more processors and has one or more computer programs stored thereon including a set of instructions 405. This set of instructions when executed by one or more processors cause the one or more processors to perform operations of generating the genetic merit interface to display to a user thereof one or more online genetic merit scorecards, determining relative market value and ranking of the genetic merits of the sale group responsive to receiving the plurality of genetic merit estimates from the one or more genetic merit databases and outputting to the one or more electronic interfaces 407 the online genetic merit scorecard for the sale group responsive to determining the relative market value and the ranking of the genetic merits for the sale group. The genetic merit interface allows an input of a plurality of genetic merit estimates associated with a sale group. In certain embodiments, the set of instructions may further include determining relative market value for the sale group by use of one or more multivariate non-linear regression equations based on the plurality of genetic merit estimates. The sale group includes cattle that are fed and harvested for beef production. The online genetic merit scorecard includes the relative market value and one or more rankings of genetic merits of the sale group. An example of an online genetic merit scorecard 65 is provided in FIG. 6. Various portions of systems and methods described herein, may include or be executed on one or more computer systems similar to system 401.

In some embodiments, the online genetic merit scorecard system includes one or more processors, an input/output unit adapted to be in communication with the one or more processors, one or more genetic merit databases in communication with the one or more processors to store and associate a plurality of genetic merit estimates with a plurality of economic outcomes and a plurality of economic weighting factors; and non-transitory computer-readable medium. This non-transitory computer-readable medium is positioned in communication with the one or more processors and having one or more computer programs stored thereon including a set of instructions. This set of instructions when executed by one or more processors cause the one or more processors to perform operations of utilizing one or more electronic interfaces positioned to display an online genetic merit scorecard and defining one or more genetic merit interfaces, then determining, by one or more processors, a plurality of economic weighting factors responsive to receiving the plurality of genetic merit estimates from the genetic merit interfaces and economic outcomes from the one or more genetic merit databases. The instructions further include determining, by one or more processors, relative market value and ranking of the genetic merit estimates for the sale group responsive to receiving the plurality of genetic merit estimates and the plurality of economic weighting factors from the one or more genetic merit databases and outputting to the one or more electronic interfaces 407 the online genetic merit scorecard for the sale group responsive to determining the relative market value and the ranking of the genetic merits of the sale group. The genetic merit interface allows an input of a plurality of genetic merit estimates associated with a sale group.

The sale group includes cattle that are fed and harvested for beef production. The online genetic merit scorecard includes the relative market value and one or more rankings of genetic merits of the sale group.

In certain embodiments, provided is a computer-implemented method to determine relative market value of a sale group. The sale group includes cattle that are fed and harvested for beef production. The method includes determining, by one or more processors, a plurality of economic weighting factors responsive to a plurality of genetic merit estimates associated with the sale group and one or more economic outcomes, and then determining, by one or more processors, relative market value and ranking of the genetic merits of the sale group responsive to the plurality of genetic merit estimates and a plurality of economic weighting factors. The method includes outputting to one or more electronic interfaces 407, positioned to display an online genetic merit scorecard to thereby define one or more genetic merit interfaces, the online genetic merit scorecard for the sale group responsive to determining the relative market value and the ranking of the genetic merits of the sale group. The online genetic merit scorecard includes the relative market value and one or more rankings of genetic merits of the sale group being displayed on the one or more genetic merit interfaces.

In certain embodiments, the online genetic merit scorecard may further include one or more of documentation of calf management practices associated with the sale group positioned to be readily accessible to a user of the one or more electronic interfaces. In certain embodiments, the online genetic merit scorecard may further include one or more of source and age identification of the sale group through an USDA approved process positioned to be readily accessible to a user of the one or more electronic interfaces.

Figure 4B:
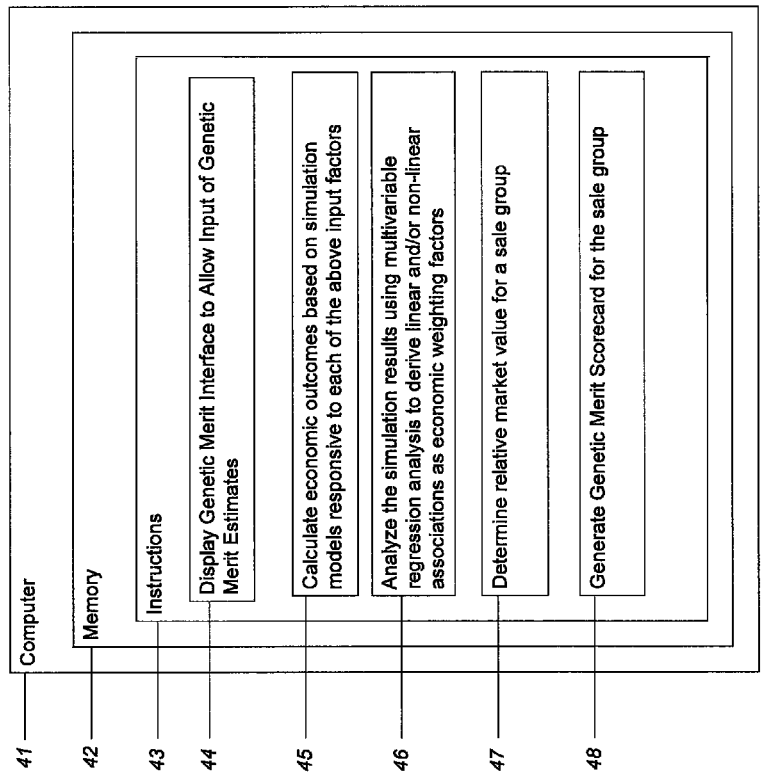
FIG. 4B is a schematic block diagram of the operational flow of computer-readable operations stored on a computer-readable medium in the memory of a computer according to an exemplary embodiment of the present invention.

As illustrated by using an example in FIG. 4B, the methods of determining the relative market value of a sale group as discussed above can be driven by a computer 41 that can include, according to various exemplary embodiments of the present invention, at least a memory 42, a processor, and an input/output device. As used herein, the processor can include, for example, one or more microprocessors, microcontrollers, and other analog or digital circuit components configured to perform the functions described herein. The processor is the "brain" of the respective computer, and as such, can execute one or more computer program product or products. For example, the processor in the genetic merit scorecard system can execute a computer program product or instructions 43 stored in memory 42 of the computer 41, including, for example, a product to facilitate the generation of a genetic merit scorecard. Such a product can include a set of instructions to display 44 a genetic merit interface at a remote computer that would allow a user to input genetic merit estimates of an animal or a plurality of animals. Such a product can also include instructions to calculate 45 economic outcomes responsive to these genetic merit estimates, and utilize 46 all genetic merit estimates and associated economic weighting factors to determine 47 a relative market value of a sale group. In an embodiment, one can also generate 48 a genetic merit scorecard based on the relative market value and the genetic merit estimates. Such a genetic merit scorecard may contain a relative market value along with a star ranking of the genetic merits of the animals on a percentile basis. An example of a genetic merit scorecard 65 is provided in FIG. 6.

The processor can be any commercially available terminal processor, or plurality of terminal processors, adapted for use in or with the computer 41 or system 401. A processor may be any suitable processor capable of executing/performing instructions. A processor may include a central processing unit (CPU) that carries out program instructions to perform the basic arithmetical, logical, and input/output operations of the computer 41 or system 401. A processor may include code (e.g., processor firmware, a protocol stack, a database management system, an operating system, or a combination thereof) that creates an execution environment for program instructions. A processor may include a programmable processor. A processor may include general and/or special purpose microprocessors. The processor can be, for example, the Intel® Xeon® multicore terminal processors, Intel® micro-architecture Nehalem, and AMD Opteron™ multicore terminal processors, Intel® Core® multicore processors, Intel® Core iSeries® multicore processors, and other processors with single or multiple cores as is known and understood by those skilled in the art. The processor can be operated by operating system software installed on memory, such as Windows Vista, Windows NT, Windows XP, UNIX or UNIX-like family of systems, including BSD and GNU/Linux, and Mac OS X. The processor can also be, for example the TI OMAP 3430, Arm Cortex A8, Samsung S5PC100, or Apple A4. The operating system for the processor can further be, for example, the Symbian OS, Apple iOS, Blackberry OS, Android, Microsoft Windows CE, Microsoft Phone 7, or PalmOS. Computer system 401 may be a uni-processor system including one processor (e.g., processor 403a), or a multi-processor system including any number of suitable processors (e.g., 403a-403n). Multiple processors may be employed to provide for parallel and/or sequential execution of one or more portions of the techniques described herein. Processes and logic flows described herein may be performed by one or more programmable processors executing one or more computer programs to perform functions by operating on input data and generating corresponding output. Processes and logic flows described herein may be performed by, and apparatus can also be implemented as, special purpose logic circuitry, e.g., an FPGA (field programmable gate array) or an ASIC (application specific integrated circuit). Computer system 1000 may include a computer system employing a plurality of computer systems (e.g., distributed computer systems) to implement various processing functions.

A computer 41 as illustrated in the example described in FIG. 4B can further include a non-transitory memory or more than one non-transitory memories (referred to as memory 42 herein). Memory 42 can be configured, for example, to store data, including computer program product or products, which include instructions for execution on the processor. Memory can include, for example, both non-volatile memory, e.g., hard disks, flash memory, optical disks, and the like, and volatile memory, e.g., SRAM, DRAM, and SDRAM as required to support embodiments of the instant invention. As one skilled in the art will appreciate, though the memory 42 is depicted on, e.g., a motherboard, of the computer 41, the memory 42 can also be a separate component or device, e.g., flash memory, connected to the computer 41 through an input/output unit or a transceiver. As one skilled in the art will understand, the program product or products, along with one or more databases, data libraries, data tables, data fields, or other data records can be stored either in memory 42 or in separate memory (also non-transitory), for example, associated with a storage medium such as a database (not pictured) locally accessible to the computer 41, positioned in communication with the computer 41 through the I/O device. Non-transitory memory further can include drivers, modules, libraries, or engines allowing the genetic merit scorecard computer to function as a dedicated software/hardware system (i.e., a software service running on a dedicated computer) such as an application server, web server, database server, file server, home server, standalone server. For example, non-transitory memory can include a server-side markup language processor (e.g., a PHP processor) to interpret server-side markup language and generate dynamic web content (e.g., a web page document) to serve to client devices over a communications network.

Embodiments of the present invention include generating a genetic merit interface for acquiring the information associated with the sale group, for example, genetic merit estimates, management information, environmental conditions, nutritional conditions, and other information relevant to the assessment of the sale group. In an exemplary embodiment of the present invention, the genetic merit interface is generated by a computer program product in communication with a computer associated with a genetic merit scorecard system. As is perhaps best illustrated by FIG. 5, exemplary embodiments of the present invention include a genetic merit interface. As used herein, a genetic merit interface is a graphical user interface facilitating the acquisition of data from the user to determine the relative market value of an animal or a plurality of animals. This electronic interface can also display the genetic merit scorecard. The graphical user interface device can include, for example, a CRT monitor, a LCD monitor, a LED monitor, a plasma monitor, an OLED screen, a television, a DLP monitor, a video projection, a three-dimensional projection, a holograph, a touch screen, or any other type of user interface which allows a user to interact with one of the plurality of remote computers using images as is known and understood by those skilled in the art. FIG. 5 for example illustrates a genetic merit interface 51 that can be displayed on one or more display devices of remote computers used by the users according to an exemplary embodiment of the present invention.

The genetic merit interface 51 can include, by way of example, a user information form that facilitates the acquisition of data like user name 52, user address 53, and a description of the herd 54. The genetic merit interface may contain user login and user verification features. The description of the herd field 54 may be modified to include the description of one animal or of a plurality of animals or of a sale group. The genetic merit interface 51 can also include mechanisms 55 to allow the user to input genetic merit estimates. These mechanisms can include, for example, a drop-down selection tool to facilitate the selection of values already available in the genetic merit scorecard system by using a "Choose EPD" option. These mechanisms can also include, for example, manual input by the user of EPD values by choosing the "Enter EPD" option. The genetic merit interface 51 can also include user navigation buttons, like a button to allow the user to input more genetic merit estimates by using the "Click to add more Genetic Merit Estimates" option 56. The user navigation buttons can also include buttons such as "Submit" that allow the user to submit the data to the merit scorecard system, and the system can generate relative market values and display the values such as relative market value/head 57 or relative market value/cwt 58. The genetic merit interface 51 can also include buttons to generate a genetic merit scorecard 59. For example, a button such as "Click to generate Genetic Merit Scorecard" would allow the user to access a relative market value and the genetic merit estimates in the format, for example, as provided in the illustration in FIG. 6. The genetic merit interface 51 can also include button or navigation options for the user to add more information to the genetic merit scorecard system, including, but not limited to, performance information from an individual animal, or from its contemporary group, or its relatives. The genetic merit interface 51 can also include button or navigation options for the user to add more information to the genetic merit scorecard system, including but not limited to, environmental conditions, management information, nutritional information, or combinations thereof. The genetic merit interface 51 can include, by way of example, links to other services available for the user. These links can be, for example, hyper-text markup language ("HTML") links or any other kind of linking interface as known and understood by those skilled in the art. The user input and navigation options available on the genetic merit interface may be used by means of input devices, such as a mouse or a keyboard. The keyboard can include, for example, an alphanumeric keyboard, an IBM PC keyboard, an Apple keyboard, a chorded keyboard, a brail keyboard, a numeric keypad, a stenograph, a QWERTY keyboard, and any other electronic keyboard as is known and understood by those skilled in the art. The mouse can include, for example, a mechanical mouse, an optical mouse, a three-dimensional mouse, a gyroscopic mouse, an inertial mouse, a double mouse system, a track ball, a laser mouse, or any other pointing device that detects motion relative to a supporting surface as is known and understood by those skilled in the art. Moreover, according to various embodiments of the present invention, the graphical user interface 51 can be an Internet website, accessible by a communications network, and can include a graphical user interface title (not shown), a graphical user interface subtitle (not shown), and one or more graphical user interface input components as known and understood by those skilled in the art.

Figure 6:
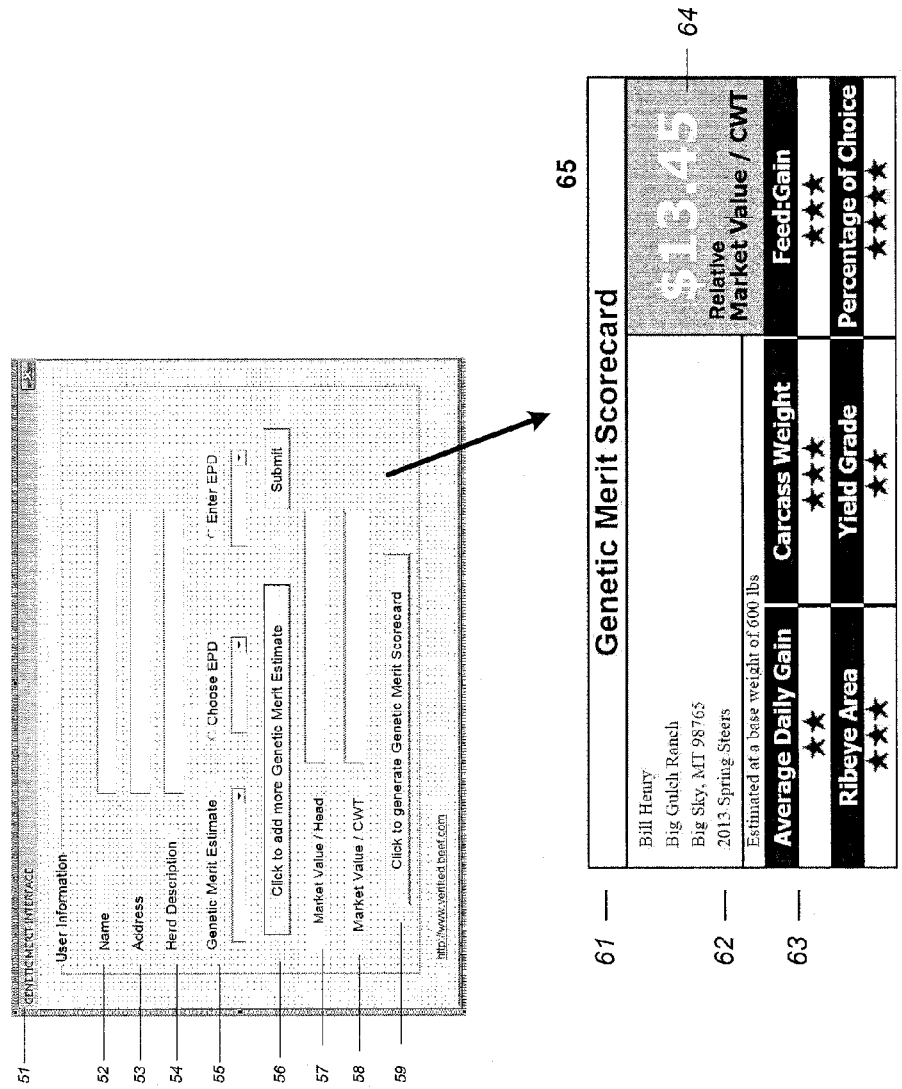
FIG. 6 is a schematic diagram of a genetic merit interface displayed at a remote computer, along with an image of the output, according to an exemplary embodiment of the present invention.

FIG. 6 is a schematic diagram of a genetic merit interface 51 displayed at a remote computer, along with an exemplary representation of an output, a genetic merit scorecard 65, according to an exemplary embodiment of the present invention. The genetic merit scorecard 65 can include information 61 about the user and/or owner of the animal or the plurality of animals. It 61 can also include a description of the animal or the plurality of animals. It can also include the number of animals and their base weight as illustrated in section 62. The genetic merit scorecard 65 can also include the genetic merit estimates provided by the user through the genetic merit interface 51. The genetic merit scorecard 65 also includes the relative market value 64 of the sale group displayed as a relative market value/head or relative market value/cwt. The genetic merit scorecard may include a star ranking 63 of the genetic merits of the sale group as compared to the national or industry values on a percentile basis. As understood by those having skill in the art, there are numerous ways and variations for implementing the comparison of the genetic merits of the sale group to the national or industry values. For example, instead of using stars, the ranking system may utilize alphabets, numerals, characters, symbols, or combinations thereof.

The star rankings as described in Table 2 reveal where a particular sale group rank on a percentile basis within the industry. Values of genetic merit estimates <$20^{th}$ percentile is one star, 20-$40^{th}$ percentile is two stars, 40-$60^{th}$ percentile is three stars, 60-$80^{th}$ percentile is four stars, >$80^{th}$ percentile is five stars. The ancestral EPD, for example, the sire's and maternal grandsire's EPD of genetic merits may be used to estimate the rank of the sale group. In an embodiment, the sale group's rank is then compared to values within a proprietary database to derive the percentile rank. In other embodiments, the sale group's rank may be compared to values within public databases to derive the percentile rank.

TABLE 2

| Star Ranking | Percentile Rank within the industry |
|---|---|
| ★ | <$20^{th}$ percentile |
| ★★ | 20-$40^{th}$ percentile |
| ★★★ | 40-$60^{th}$ percentile |
| ★★★★ | 60-$80^{th}$ percentile |
| ★★★★★ | >$80^{th}$ percentile |

The star rankings as described in Table 2 tell the potential buyer of the sale group why this group is worth more or less than the average. These component genetic merits drive the value of the relative market prediction. The genetic merit scorecard 65 also includes the relative market value 64 of the sale group displayed as a relative market value/head or relative market value/cwt. As understood by those having skill in the art, there are numerous ways and variations for implementing the present invention.

Historically, cattle buyers have placed significantly higher value for feeder cattle with a known history of prior animal health and management. Age and Source-verified cattle have attracted a premium in the export market for the past several years. Age and Source verification continues to provide value through specific market channels and as the foundation for niche market products and/or export markets. In certain embodiments, the genetic merit scorecard system may be part of a livestock certification program. For example, the genetic merit scorecard system can be used by feedyards as part of a livestock certification program, like the "Reputation Feeder Cattle" (RFC) program, as illustrated in FIGS. 7A and 7B. Using third party audited programs, for example RFC, feedyards and buyers can identify cattle quality based on several principles, like genetic merit, calf management practices, age and source verification, compliance with non-hormone treatment, and cattle care and handling guidelines. In an embodiment shown in FIG. 7A, this exemplary program consists of several parts to aid in marketing and procurement decisions, for example: 1) Genetic Merit Scorecard, 2) Calf Management certification, and 3) Age and Source verification. In another embodiment shown in FIG. 7B, the "Reputation Feeder Cattle" (RFC) program consists of several parts to aid in marketing and procurement decisions, for example: 1) Genetic Merit Scorecard, 2) Calf Management certification, 3) Age and Source verification, 4) Non-hormone Treated Cattle certification, and 5) Cattle Care and Handling verification. Once quality feeder cattle are identified, sustaining them at the right nutritional and management framework is important to achieve the most economic value. The genetic merit of a sale group cannot be realized without proper health and management practices. Without proper documentation of health and other management practices, buyers will discount the realizable value of the genetic merit of the animals due to the risk of sickness and death. Documented animal health and management programs, like weaning and vaccination programs enhance the revenue available to cow-calf producers. The most valuable cattle are the ones with a strong nutritional foundation, solid health history and the genetic background to perform both in the feedlot and at the packing plant. In certain embodiments, the sale group has documented vaccination, mineral, and managerial processes. For example, as illustrated in FIGS. 7A and 7B, the sample sale group has its prescribed veterinary practices audited to show compliance with vaccination protocols. The certificate illustrated in FIG. 7B also provides documentation regarding both an USDA audit for compliance with the NHTC program, and a third party audit to show compliance of the cattle care and handling protocols in compliance with specific portions of the National Beef Quality Assurance guidelines.

Documentation such as those discussed above and in FIGS. 7A and 7B helps the buyer ascertain the costs and risk associated with realizing the economic potential of the sale group as predicted by the relative market value. In certain embodiments, the sale group is composed of young animals, selected by age and source. Source and age verification helps ensure that the buyer is receiving the sale group for which the Genetic Merit Scorecard was generated. Verification of source and age and Non-Hormone Treated Cattle (NHTC) must be documented and verified through a recognized United States Department of Agriculture program. The USDA Agricultural Marketing Service's Non-Hormone Treated Cattle (NHTC) Program controls the quality measures in the trade and export of non-hormone treated beef between the European Union (EU) and the United States. USDA's Audit, Review, and Compliance (ARC) Branch conducts assessments to verify that the production of non-hormone treated cattle meet the specified product requirements of the NHTC Program guidelines for export to the EU. Production companies that would like to be certified as an approved NHTC Program provider must submit a written quality management system manual outlining the policies and procedures employed to ensure effective quality control compliance in the beef production process of non-hormone treated cattle. The compliance program is reviewed and certified through independent, third party audits conducted by the ARC Branch.

Other optional USDA audited certifications include the NE3 and the Grass Fed program. Through the Never Ever 3 (NE3) program, the cattle meet a niche consumer demand for beef that is certified as never being given antibiotics, growth promoting hormones and/or feed ingredients containing animal by-products. Certain consumers desire to consume beef which has not been fed grain from birth to harvest. Through the Grassfed program, an operator in the beef production process can get the "Grass Fed" marketing claim by demonstrating that only grass and forage have been consumed by the animal, with the exception of milk consumed prior to weaning. This program provides verification necessary to meet the demands of this market channel. The genetic scorecard may contain verification of compliance with other USDA programs like NE3 and Grass Fed programs. In other embodiments, the genetic scorecard may be included as part of the NE3 and Grass Fed program verification process.

The genetic scorecard may contain the age and source verification and NHTC information. In other embodiments, the genetic scorecard may be included as part of the age and source verification process, as illustrated in FIG. 7A. In other embodiments, the genetic scorecard may be included along with verification of age and source, calf management practices, non-hormone treatment protocols, appropriate care and handling guidelines, as illustrated in FIG. 7B. In an embodiment of the genetic merit scorecard system, a genetic merit scorecard may be generated that includes a recommended feed regimen for the sale group to maintain the relative market value based on the plurality of genetic merit estimates and other information provided by the user.

Figure 8:
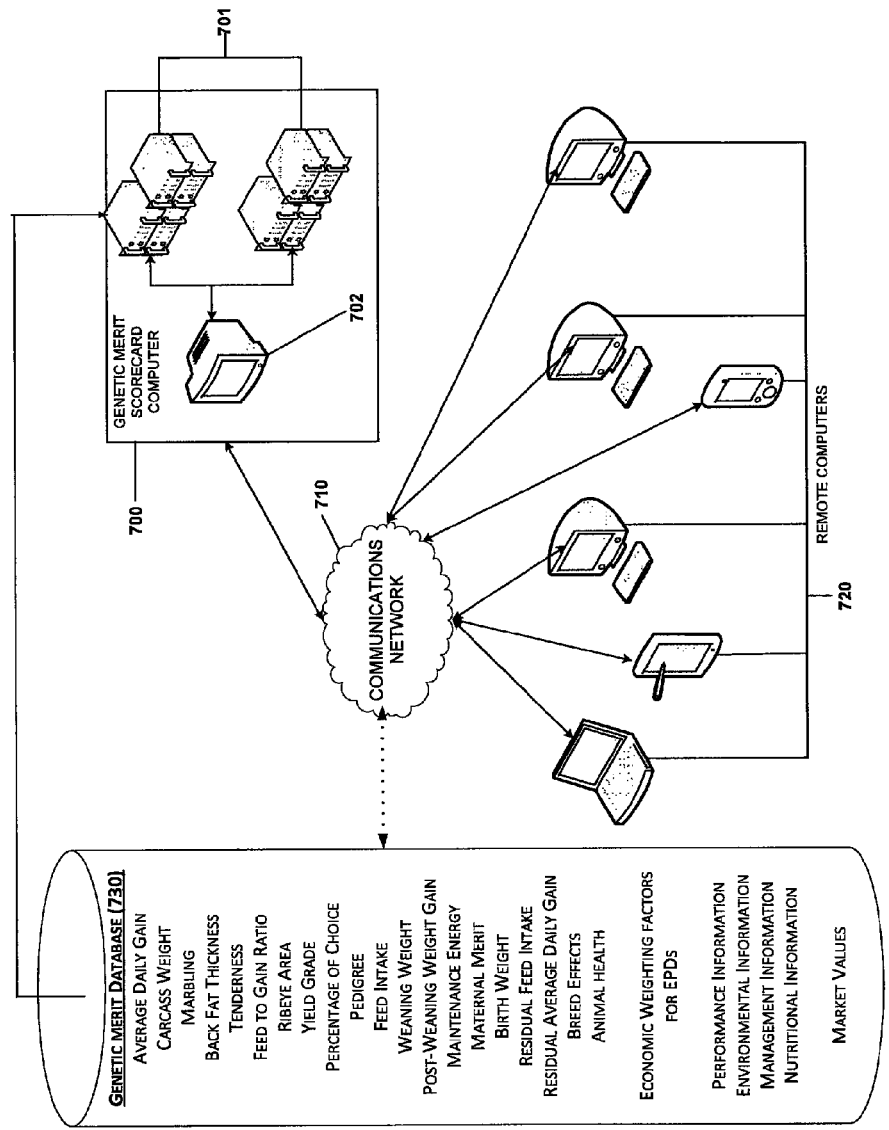
FIG. 8 is a schematic block diagram of a system, computer-implemented method, and non-transitory, computer-readable medium to determine relative market value of a sale group, according to an exemplary embodiment of the present invention.

As is perhaps best illustrated by FIG. 8, various exemplary embodiments of the present invention beneficially can include a genetic merit scorecard system to determine a relative market value of a plurality of animals, for example, a herd of calves of livestock. The genetic merit scorecard system can include one or more processors and a non-transitory computer-readable medium having computer program stored thereon, including a set of instructions, that when executed by one or more processors cause the one or more processors to perform operations of generating a genetic merit interface to display at one or more of the plurality of remote computers, the genetic merit interface allowing an input of a plurality of genetic merit estimates for an animal or a plurality of animals and to transmit from the respective remote computer the plurality of genetic merit estimates to the genetic merit scorecard system; determining a relative market value for the an animal or the plurality of animals responsive to receiving the plurality of genetic merit estimates at a respective remote computer, and outputting a genetic merit scorecard for an animal or a plurality of animals responsive to determining the relative market value.

Such a system can include, for example, a communications network 710, a plurality of remote computers 720, a genetic merit scorecard computer 702, associated servers 701, and a database 730. One or more entities may control the genetic merit scorecard administration 700 that includes a genetic merit scorecard computer 702, and associated servers 701, with communication to a database 730, and a plurality of remote computers 720. The communications network 710 can include a telephony network, a wireline network, a wireless network, a wide area network, a local area network, an infrared network, a radio-frequency network, an optical network, or any other communications network now or hereinafter created as is known and understood by those skilled in the art. Each of the plurality of remote computers 720 allows a human user, such as a livestock owner, to interact with the genetic merit scorecard system. The human user can be, for example, an owner of livestock or an employee or agent thereof. The human user, however, is not limited to owners of livestock or livestock producers. Any human being can be a human user. That is, according to other exemplary embodiments of the present invention, the human user can be an insurer, a livestock purchaser, a livestock seller, a rancher, a cow-calf operations owner, a feedlot operator, a member of a breed association, a breed association, an insurance issuing entity, or any other person working with livestock and other animals as is known and understood by those skilled in the art. Each of the remote computers 720 allows such a human user, for example, to input information associated to a sale group as is described herein with respect to the genetic merit scorecard system. Each of the remote computers 720 allows such a human user, for example, to receive the relative market value of a sale group, and to receive a genetic merit scorecard.

Each of the plurality of remote computers 720 can be, for example, any type of stationary or portable personal computing device such as a desktop computer, laptop computer, micro computer, mini computer, netbook computer, ultra-mobile computer, tablet computer, handheld computer, mobile telephone, personal digital assistant (PDA), so-called "smartphone," or any other computing device intended to be operated directly by an end user with no intervening computer operator as is known and understood by those skilled in the art. Each of the plurality of remote computers 720 can include, for example, a keyboard, a mouse, a graphical user interface device, a display, a microphone, electronic speakers, a modem, a LAN card, a computer graphics card, a printer, a scanner, a disk drive, a tape drive, a camera, a Wi-Fi card, a PCMCIA card, or any other peripheral device as is known and understood by those skilled in the art. If the remote computer is a mobile device, as is known and understood by those skilled in the art, the mobile device can include, but is not limited to, a cellphone device, a handheld device, a handheld computer, a palmtop, a handheld device, or any other mobile computing device. Such a mobile device can also include, for example, a display screen with a touch input user interface or a miniature keyboard, or a touch-screen interface. A PDA can include, for example, a processor, memory, an input device, and an output device. Additionally, a PDA, for instance, can include a palmtop computer, a smartphone, a palm device, a portable media player, a Wi-Fi enabled device, a global positioning system device, or any other handheld computing device now or hereinafter developed as is known and understood by those skilled in the art. Embodiments having one or more computers as a laptop computer include, for example, the Apple MacBook, MacBook Air, and MacBook Pro product families; the Dell Inspiron and Latitude product families; the Lenovo ThinkPad and IdeaPad product families; the Panasonic Toughbook product families; and the Toshiba Satellite product families. Examples of embodiments having one or more remote computers 720 as a smartphone include, for example, the iPhone series by Apple Computer, Inc. of Cupertino, Calif. and the Droid devices by Motorola, Inc. of Schaumburg, Ill.

Each of the remote computers 720 allows such a human user, for example, to receive the relative market value of a sale group, and to receive a genetic merit scorecard. The relative market value of a sale group and the genetic merit scorecard may be received by a user in a variety of formats, including but not limited to, paper print-outs, graphical or text displays on a computer or mobile device, electronic messages like an e-mail or text, online formats, and other equivalent formats. The output from a genetic merit scorecard system can include other techniques including updating a record in a database, updating a spreadsheet, and sending instructions and/or data to specialized software, such as an application on a mobile device, or combinations thereof. In other embodiments, the output from a genetic merit scorecard system may include formats and reports stored on computer readable medium (such as a CD. USB flash drive or other removable storage device, computer hard drive, or computer network server, etc.). The output from a genetic merit scorecard system, particularly those stored on computer readable medium, can be part of a database, which may optionally be accessible via the internet, such as a database of relative market values or genetic merit estimates associated to one or more sale groups stored on a computer network server. The database may be a secure database with security features that limit access to the relative market values or genetic merit scorecards, such as to allow only authorized users to view them. The output from a genetic merit scorecard system may be transmitted to a plurality of potential buyers of the livestock sale groups. The output from a genetic merit scorecard system may be transmitted to web-based public or private livestock sales and marketing systems. Such sales and marketing systems may include online auctions, live auctions, individualized cattle purchases, broker mediated cattle purchases, video marketing, online marketing, and other combinations thereof. In other embodiments, the output from a genetic merit scorecard system may accompany the description of a sale group, and may be marketed or distributed in different formats, including but not limited to, written catalogs, websites, specialized sales software, or satellite television.

According to various exemplary embodiments of the present invention, the database 730 can be any database structure as is known and understood by those skilled in the art. The databases discussed herein, including database 730, can be, for example, any sort of organized collection of data in digital form. Databases, including database 730, can include the database structure as well as the computer programs that provide database services to other computer programs or computers, as defined by the client-server model, and any computer dedicated to running such computer programs (i.e., a database server). An exemplary database model, for example, is Microsoft SQL Server 2008 R2. Databases can include a database management system (DBMS) consisting of software that operates the database, provides storage, access, security, backup and other facilities. DBMS can support multiple query languages, including, for example, SQL, XQuery, OQL, LINQ, JDOQL, and JPAQL. Databases can implement any known database model or database models, including, for example, a relational model, a hierarchical model, a network model, or an object-oriented model. The DBMS can include Data Definition Language (DDL) for defining the structure of the database, Data Control Language (DCL) for defining security/access controls, and Data Manipulation Language (DML) for querying and updating data. The DBMS can further include interface drivers, which are code libraries that provide methods to prepare statements, execute statements, fetch results, etc. Examples of interface drivers include ODBC, JDBC, MySQL/PHP, FireBird/Python. DBMS can further include a SQL engine to interpret and execute the DDL, DCL, and DML statements, which includes a compiler, optimizer, and executor. DBMS can further include a transaction engine to ensure that multiple SQL statements either succeed or fail as a group, according to application dictates. DBMS can further include a relational engine to implement relational objects such as Table, Index, and Referential integrity constraints. DBMS can further include a storage engine to store and retrieve data from secondary storage, as well as managing transaction commit and rollback, backup and recovery, etc.

Data stored in fields of the databases can be updated as needed, for example, by a user with administrative access to the database to add new data to the libraries in the database as they become supported. It will be appreciated by those having skill in the art that data described herein as being stored in the databases can also be stored or maintained in non-transitory memory and accessed among subroutines, functions, modules, objects, program products, or processes, for example, according to objects and/or variables of such subroutines, functions, modules, objects, program products or processes. Any of the fields of the records, tables, libraries, and so on of the database can be multi-dimensional structures resembling an array or matrix and can include values or references to other fields, records, tables, or libraries. Any of the foregoing fields can contain either actual values or a link, a join, a reference, or a pointer to other local or remote sources for such values.

Database 730 can be, for example, a single database, multiple databases, or a virtual database, including data from multiple sources, for example, servers on the World Wide Web. The genetic merit database 730 can contain several types of data, including but not limited to, genetic merit estimates, economic weighting factors, animal performance information, relatives' performance information, performance information from contemporary groups, historical sales data, sales projection data, and real-time market values for animals and operational expenses, like feed, labor, interest, and health. Database 730 can also contain genetic merit estimates, including but not limited to, EPD from relatives, and contemporary groups for average daily gain, carcass weight, marbling, back fat thickness, feed to gain ratio, ribeye area, yield grade, tenderness, percentage of choice, pedigree, breed effects, feed intake, animal health, weaning weight, post weaning weight gain, maintenance energy, maternal merit, birth weight, or residual feed intake, residual average daily gain, or any linear or non-linear combination of any two or more of these traits. Database 730 can be the inventors' proprietary database (e.g., the Leachman database) or one populated with data from publicly available databases.

Figure 9:
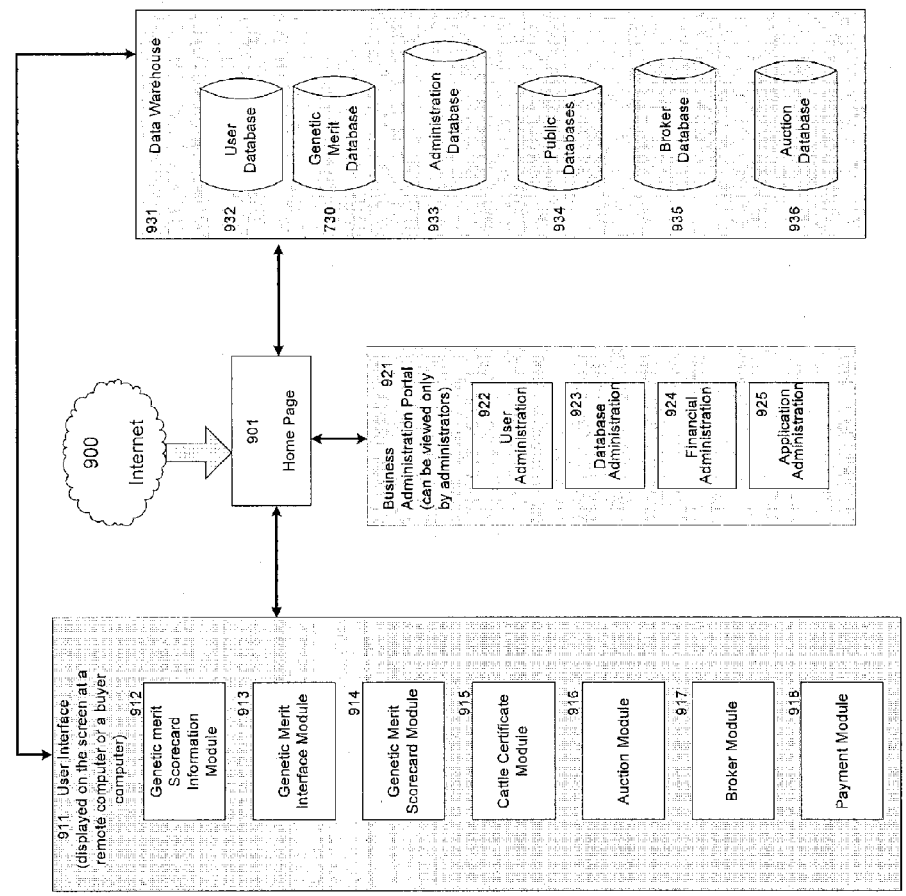
FIG. 9 is a schematic block diagram of a system, computer-implemented method, and non-transitory, computer-readable medium configured to run on the internet to determine relative market value of a sale group, according to an exemplary embodiment of the present invention.

According to various exemplary embodiments of the present invention, for example, and as illustrated by FIG. 9, the genetic merit database 730 can be part of a data warehouse 931. Such a data warehouse may include other databases, for example a user database 932, an administration database 933, content from or links to other public databases 934, an auction database 936, and/or a broker database 935. The user database 932 can be configured, for example, to store any data related to user information, including user names, user addresses, membership information, payment records, data related to user's herd or livestock, and any other information related to a user and his sale group, as is known and understood by those skilled in the art. The administration database 933 can be configured, for example, to store any data related to determining relative market values and generating genetic merit scorecards, like data related to the number of users, the animals and/or herds used, payment records, system and access updates, database updates, and any other information related to maintenance and operation of the genetic merit scorecard system, as is known and understood by those skilled in the art. The public databases 934 can contain several types of data, including but not limited to, genetic merit estimates, animal performance information, performance information from relatives, performance information from contemporary groups, historical sales data, sales projection data, and real-time market values for animals and operational expenses, like feed, labor, interest, and health. Database 934 can also contain publicly available information related to the sale of livestock, for example, genetic merit estimates obtained from relatives of the animal or the sale group. Such genetic merit estimates would include EPD of at least two of the following: average daily gain, carcass weight, marbling, back fat thickness, feed to gain ratio, ribeye area, yield grade, tenderness, percentage of choice, pedigree, breed effects, feed intake, weaning weight, post-weaning weight gain, maintenance energy, maternal merit, birth weight, residual feed intake, animal health, residual average daily gain, or any linear or non-linear combination of any two or more of these traits. The broker database 935 can be configured, for example, to store any data related to livestock sales. For example, such data may include data related to buyers of livestock, sellers of livestock, past purchasing and selling behaviors, past purchases, past sales, and related geographic information. The auction database 936 can be configured, for example, to store any data related to livestock auctions. For example, such data may include data related to buyers of livestock, sellers of livestock, past bidding and purchasing behaviors, past purchases, and related geographic information. The auction database 936 can be configured to store historical auction data, such as the characteristics of the sale groups and the final sale prices. Databases can be, for example, a Microsoft SQL server providing database services as an enterprise-class server that providing reliable capabilities when used to support web applications. Microsoft SQL can store, for example, all data required by the genetic merit scorecard system for administration, user, and application support.

FIG. 9 is a schematic block diagram of a system, computer-implemented method, and non-transitory, computer-readable medium configured to run on the internet to determine relative market value of a sale group, according to an exemplary embodiment of the present invention. Such exemplary embodiments of the present invention can provide a home page 901 that facilitates selection, confirmation, and purchase of genetic merit scorecards via the Internet 900. Genetic Merit Scorecard computers 700 would launch a home page 901 at remote computers 720 or at buyer computers 740. The home page can be operably configured to interface with a user interface 911, an online business administration portal 921, and a data warehouse 931. The user interface 911 can include, for example, at least one or more of several modules, including but not limited to, a genetic merit scorecard information module 912, a genetic merit interface module 913, a genetic merit scorecard generating module 914, a cattle certification module 915, an auction module 916, a broker module 917, and a payment center module 918. Whereas the user interface 911 can be, for example, the face of the system to the user, the online business administration portal 921 can be, for example, the face of the system to the entity that is operating the genetic merit scorecard system. The business administration portal 921 can therefore include, for example, a user administration module 922, a database administration module 923, a financial administration module 924, and an application administration module 925. The financial administration module 924 can be configured to communicate with the payment center 918, and accept different mechanisms of payment. Payment mechanisms, include for example, electronic checks (ACH), paper checks by U.S. mail, debit cards, credit cards, gift cards, coupon card, coupon, debit cards by U.S. mail, credit cards by U.S. mail, Internet cash, Internet payment mechanisms such as PayPal, and any other payment mechanism now known or herein after developed as is known and understood by those skilled in the art.

Although the various computer program product modules, including the a genetic merit scorecard information module 912, a genetic merit interface module 913, a genetic merit scorecard generating module 914, a cattle certification module 915, an auction module 916, a broker module 917, a payment center module 918, a user administration module 922, a database administration module 923, a financial administration module 924, and an application administration module 925, are described herein as individual computer program product modules, those having skill in the art will appreciate that these computer program product modules may exist as combinations and may comprise other modules or sub-modules that perform functions described of these computer program product modules. In large-scale implementations or operations, these computer program product modules may comprise several sub-modules according to techniques or programming conventions known to those having skill in the art. The following description will be understood by those having skill in the art to not limit the invention to using any particular type, style, or number of objects, classes, functions, or subroutines over any other object, class, function, or subroutines that will achieve the functions described herein.

Figure 10:
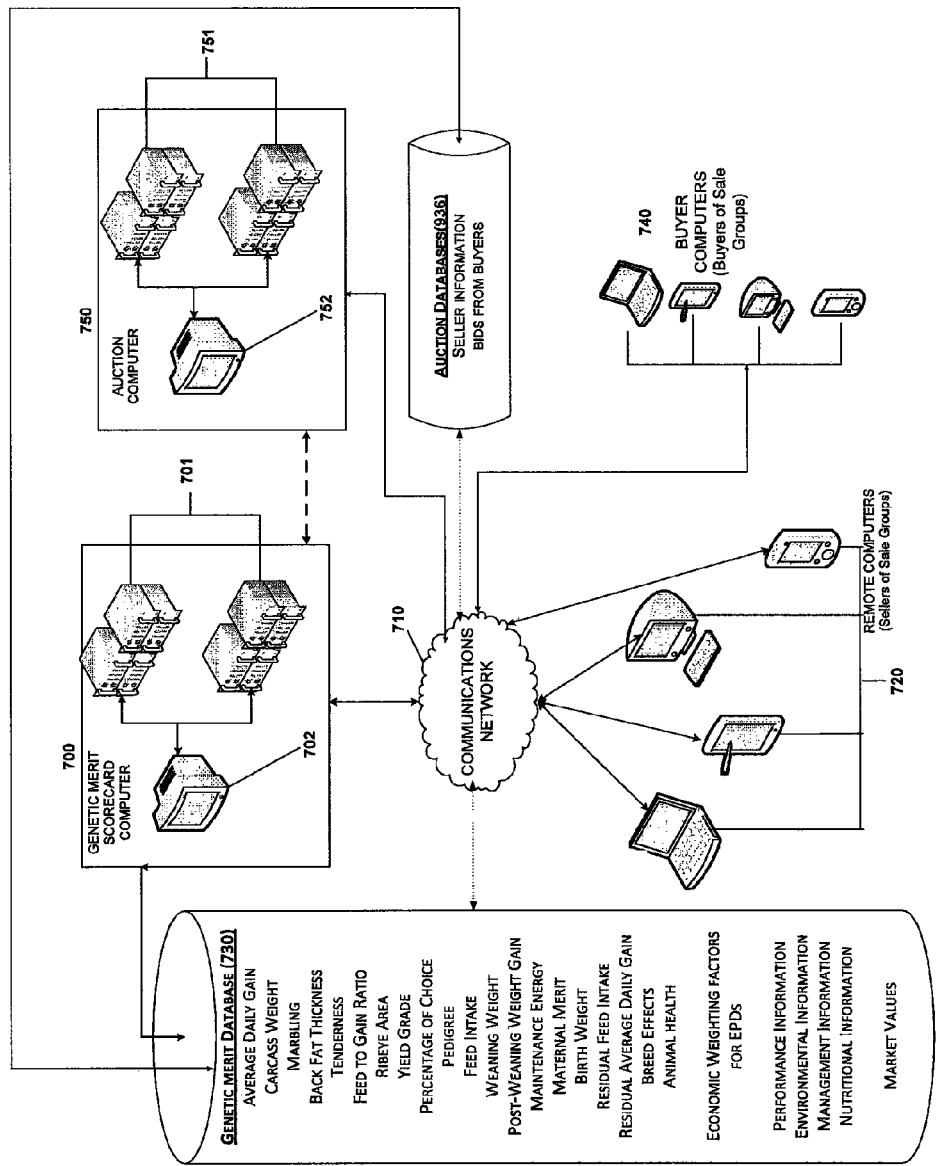
FIG. 10 is a schematic block diagram of a system, computer-implemented method, and non-transitory, computer readable medium configured to run on the internet to determine relative market value of a sale group and utilize this as part of an auction system, according to an exemplary embodiment of the present invention.

FIG. 10 is a schematic block diagram of a system, computer-implemented method, and non-transitory, computer-readable medium configured to run on the internet to determine relative market value of a sale group and utilize this as part of an auction system, according to an exemplary embodiment of the present invention. The auction computer 750 is configured to be in communication with the genetic merit scorecard computer 700. While FIG. 10 shows two individual systems, the two systems may be a single computer designed to carry out all functions contemplated by this embodiment of the invention. The auction computer 750 is configured to have an input/output device 752, supported by several processors or servers 751. A buyer wishing to access the auction through buyer computers 740 is directed through the genetic merit interface to an auction module. In certain embodiments, the genetic merit interface may have a specialized buyer interface that allows the acquisition of all information from the buyer. The buyer interface allows a buyer to view at least the genetic merit scorecard and to submit bids on price of the sale group. The buyer's information is relayed and compared to the data in an auction database 936 that is in communication with the genetic merit database and is configured to store any data related to livestock auctions. For example, such data may include data related to buyers of livestock, sellers of livestock, past bidding and purchasing behaviors, past purchases, and related geographic information. The auction database 936 can be configured to store historical auction data, such as the characteristics of the sale groups and the final sale prices.

In another embodiment, the genetic merit scorecard system can be accessed through a buyer computer at a live auction. In this embodiment, the buyer accesses the genetic merit scorecard of the sale groups that he is interested in at the live auction. Here, the buyer is using the genetic merit scorecard system only to access information regarding the relative market value of the sale groups and the genetic merit rankings. He is not using the online auction options of the system.

The buyer computer 740 can be any device, including but not limited to, a desktop computer, laptop computer, microcomputer, minicomputer, netbook computer, ultra-mobile computer, tablet computer, handheld computer, mobile telephone, personal digital assistant (PDA), so-called "smartphone," or any other computing device intended to be operated directly by an end user with no intervening computer operator as is known and understood by those skilled in the art.

Figure 11:
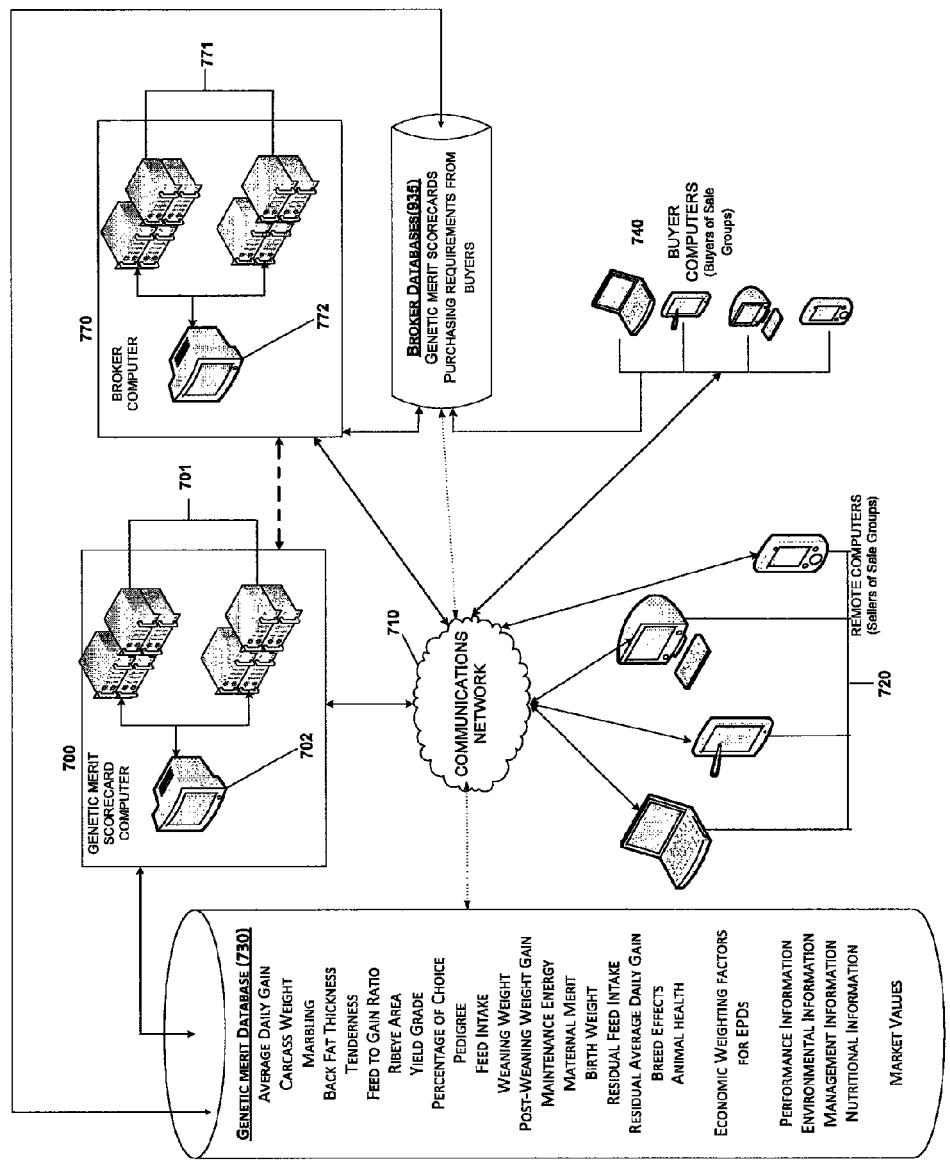
FIG. 11 is a schematic block diagram of a system, computer-implemented method and non-transitory, computer-readable medium configured to run on the internet to determine relative market value of a sale group and utilize the genetic merit scorecard as part of a brokering system, according to an exemplary embodiment of the present invention.

FIG. 11 is a schematic block diagram of a system, computer-implemented method, and non-transitory, computer-readable medium configured to run on the internet to determine relative market value of a sale group and utilize the genetic merit scorecard as part of a brokering system to facilitate transactions between interested buyers and sellers of sale groups, according to an exemplary embodiment of the present invention. The broker computer 770 is configured to be in communication with the genetic merit scorecard computer 700. While FIG. 10 shows two individual systems, the two systems may be a single computer designed to carry out all functions contemplated by this embodiment of the invention. The broker computer 770 is configured to have an input/output device 772, supported by several processors or servers 771. A buyer wishing to access the system through buyer computers 740 is directed through the genetic merit interface to a broker module. In certain embodiments, the genetic merit interface may have a specialized buyer interface that allows the acquisition of all information from the buyer. The buyer interface allows a buyer to input a plurality of purchasing requirements. The buyer's information is relayed and compared to the data in a broker database 935 that is in communication with the genetic merit database 730 and is configured to store any data related to sale groups available for purchase and purchasing requirements of prospective buyers. The broker database 935 may store any information required by the system to allow selection, customization, and purchase of a sale group that meets the particular buyer's requirements.

Embodiments of the present invention include generating a broker module for acquiring information from the buyer regarding his purchasing requirements. The buyer is also allowed to view the sale groups available for purchase and other information associated with the sale group, for example, genetic merit estimates, environmental conditions, nutritional conditions, and other information relevant to the assessment of the sale group. The genetic merit interface is the graphical user interface facilitating the acquisition of data from the user, who may be a seller, buyer, or seeker of information related to sale groups.

The genetic merit scorecard system allows for users to pay for the genetic merit score card and relative market value determination for the sale groups. As described through an illustration of an exemplary method in FIG. 9, the genetic merit scorecard system generates a genetic merit scorecard and determines the relative market value for a sale group. This system can be configured to accept payment in return for these services. In the auction system, described through an illustration of an exemplary method in FIG. 10, the genetic merit interface allows for payments from the buyer, to the entity generating the genetic scorecard, or to the auctioneering entity, or to the seller. In the brokering system, described through an illustration of an exemplary method in FIG. 11, the buyer through the genetic merit interface on the buyer computer, and the seller of the sale group, through the genetic merit interface on the remote computers, can access payment mechanisms to the genetic merit scorecard system. Payment mechanisms, include for example, electronic checks (ACH), paper checks by U.S. mail, debit cards, credit cards, gift cards, coupon card, coupon, debit cards by U.S. mail, credit cards by U.S. mail, Internet cash, Internet payment mechanisms such as PayPal, and any other payment mechanism now known or herein after developed as is known and understood by those skilled in the art.

According to exemplary embodiments of the present invention, the genetic merit scorecard system can include, for example, a payment receiver. The payment receiver can, for example, be configured to receive notice of, and confirm payment for, a user's customized genetic merit scorecard or relative market value determination for a sale group. The payment receiver can, for example, be configured to receive notice of a payment, and confirm payment, for a sale group by a buyer using the auction system or the brokering system. For example, the payment receiver can be adapted to interface with a computers or servers associated with a bank, an Automated Clearing House (ACH) network or processor, a prepaid card processor, a credit-card processor, a debit-card processor, a generalized payment processor, an Internet or e-cash payment processor, or any other payment processor as is known and understood by those skilled in the art. As is known and understood by those skilled in the art, ACH is the name of an electronic network for financial transactions in the United States and is regulated by the Federal Reserve. Responsive to such interfacing with a payment processor, the payment receiver can confirm that payment for the customized genetic merit scorecard or relative market value determination for a sale group has been received from the user and store a record of such payment in the database. Responsive to the payment receiver confirming payment, the genetic merit scorecard system can, for example, generate the customized genetic merit scorecard or relative market value for the sale group and store any information related to the customized products in the respective database.

According to various exemplary embodiments of the present invention, the genetic merit scorecard computer 700 can be a server and can include, for example, any type of mainframe, physical appliance, or personal computing device such as rack server, mainframe, desktop computer, or laptop computer, dedicated in whole or in part to running one or more services to serve the needs or requests of client programs which may or may not be running on the same computer. The genetic merit scorecard computer 700 can be, for example, a dedicated software/hardware system (i.e., a software service running on a dedicated computer) such as an application server, web server, database server, file server, home server, or standalone server. As one skilled in the art will appreciate, though the genetic merit scorecard computer 700 is shown in some of the diagrams as a single server, it is possible for remote computers 720, auction computers 750, and buyer computers 740 to interface with a separate web server, application server, or network server to access the functionality of the genetic merit scorecard computer 700, for example, through the communications network 710 or other network options, and such a configuration may be preferred for certain large-scale implementations. According to various exemplary embodiments of the present invention, the auction computer 750 can be a server and can include, for example, any type of mainframe, physical appliance, or personal computing device such as rack server, mainframe, desktop computer, or laptop computer, dedicated in whole or in part to running one or more services to serve the needs or requests of client programs which may or may not be running on the same computer. As one skilled in the art will appreciate, though the auction computer 750 is shown in some of the diagrams as a single server, it is possible for remote computers 720, the genetic merit scorecard computer 700, and buyer computers 740 to interface with a separate web server, application server, or network server to access the functionality of the auction computer 750, for example, through the communications network 710 or other network options, and such a configuration may be preferred for certain large-scale implementations.

In order to provide the ability to host multiple web and database servers in a web farm, the genetic merit scorecard system can include a local traffic manager (LTM), such as the Big-IP LTM from F5, to serve as a web-platform core. The LTM can deliver high availability, improved performance, application security, and access control services to applications served by the genetic merit scorecard server. The LTM removes single points of failure and virtualizes the network and applications using industry-leading L7 intelligence. The LTM can include, for example, rich static and dynamic load balancing methods, dynamic ratio, least connections, and observed load balancing. The LTM can further ensure always-on status, provide scalability, and provide management ease.

The genetic merit scorecard computer 700 and the auction computers 750 can further include a non-transitory memory or more than one non-transitory memories. Non-transitory memory can be configured to store data, including computer program product or products, which include instructions for execution on the processor. Non-transitory memory can include both non-volatile memory, e.g., hard disks, flash memory, optical disks, and the like, and volatile memory, e.g., SRAM, DRAM, and SDRAM as required to support embodiments of the instant invention. As one skilled in the art will appreciate, though the non-transitory memory is depicted on, e.g., a motherboard, of the genetic merit scorecard computer 700 or the auction computers 750, the non-transitory memory may also be a separate component or device, e.g., flash memory, connected to the genetic merit scorecard computer 700 or the auction computers 750 through the input/output units. As one skilled in the art will understand, the program product or products, along with one or more databases, data libraries, data tables, data fields, or other data records can be stored either in non-transitory memory or in separate memory (also non-transitory), for example, associated with a storage medium such as database, positioned in communication with the livestock insurance computer through the I/O devices. Non-transitory memory can further include drivers, modules, libraries, or engines allowing livestock insurance computer to function as a dedicated software/hardware system (i.e., a software service running on a dedicated computer) such as an application server, web server, database server, file server, home server, standalone server.

The memory of a remote computer, a buyer computer, and other computers used in embodiments of the invention, for example, can further include applications, drivers, modules, libraries, or engines that allow the computers to have interactive client-side interface capabilities, including, for example a web browser application, such as Microsoft® Internet Explorer® by Microsoft Corporation of Redmond, Wash., having capabilities for processing interactive content, such as Java, JavaScript, or Flash plug-ins or scripts. Those having skill in the art will appreciate that interactive interfaces, such as the genetic merit interface, the buyer interface, and the payment graphical user interface, may be in whole or in part dynamically generated at a server computer, such as the genetic merit computer, or at one of the one or more remote computers adapted to be in communication with the genetic merit computer, using server-side processing (such as PHP, ASP, ASP.NET) and delivered to the producer computer in static mark-up language, such as HTML, for display at the remote computer using the web browser and a display peripheral device. Those having skill in the art will further appreciate that interactive interfaces, such as the genetic merit interface, the buyer interface, and the payment graphical user interface, may be in whole or in part statically generated at a server, such as the genetic merit computer, or at one of the one or more computers adapted to be in communication with the genetic merit computer, and delivered to the remote computer or the buyer computer for processing by the remote computer or the buyer computer using client-side processing (such as Java, JavaScript, or Flash) for display at the remote computer using the web browser and the display peripheral device.

As one skilled in the art will appreciate, and is perhaps best illustrated by FIGS. 9, 10, and 11, both memory and the processor can also include, for example, components (e.g., drivers, libraries, and supporting hardware connections) that allow the computers to be connected to a display peripheral device and an input peripheral device that allow a user direct access to the processor and the memory. The display peripheral device can be, for example, a computer monitor, which may also be known in the art as a display or a visual display unit. The display peripheral device also can include, for example, a display device, which in modern monitors is typically a thin film transistor liquid crystal display (TFT-LCD) thin panel, while older monitors use a cathode ray tube. The display peripheral device can include the display device, the circuitry, and the physical enclosure. The display peripheral device can be used, in connection with interactive client-side interface capabilities residing in memory, to display interactive interfaces to a user at the remote computer or the buyer computer, such as the genetic merit interface, the buyer interface, and the payment graphical user interface. As discussed in greater detail above, the display peripheral device can also be a PDA and can function, at the same time, as a display peripheral device, an input peripheral device, and an output peripheral device.

The input peripheral device can be, for example, a computer keyboard, computer mouse, a touch screen (such as a touch screen device comprising display peripheral device), a pen device, character recognition device, voice recognition device, or a similar input device that will be known to those having skill in the art that allows the user at the remote computer or the buyer computer, through mechanical, electrical, or mechanical and electrical means to send discrete or continuous signals to the processor. A status or other output associated with input peripheral device can be displayed at the display peripheral device, such as, for example, mouse pointer or a keyboard prompt. The output of input peripheral device can be received by the processor, for example, as a selection or a command associated with an interactive client-side interface, such as the genetic merit interface, the buyer interface, and the payment graphical user interface. An interactive client-side interface may be configured, for example, to receive a selection or a command from the input peripheral and, responsive thereto, transmit data, including content input by the user at the input peripheral device, as well as other content as directed by the client-side interface, to other servers or systems through the input/output unit.

According to various exemplary embodiments of the present invention, the communications network 710 can connect the genetic merit scorecard computer to the remote computers, the buyer computers, and can connect other various networked components together. As one skilled in the art will appreciate, the communications network 710 can connect all of the system components using a local area network ("LAN") or wide area network ("WAN"), or a combination thereof. For example, the genetic merit scorecard computer 700, its servers and the genetic merit database 730 can be privately networked, or privately tunneled over a public network, to allow for faster, more secure communication and better data synchronization between computing nodes. For example genetic merit scorecard computer 700, its servers and the genetic merit database 730 or database server can be networked using a LAN, with or one of the one or more auction computers 750 adapted to be in communication with the genetic merit scorecard computer 700 using a WAN. Accordingly, though not all such configurations are depicted, all are within the scope of various exemplary embodiments of the present invention.

Communications network 710 can include, for example, any public or private network communication paths to support the communications sent and received among various components of the genetic merit scorecard system, including but not limited to the genetic merit scorecard computer 700, the remote computers 720, and the buyer computers. Such networks include the public Internet, a private intranet, a virtual private network (VPN) tunneled across the public Intranet, for example, using a network security protocol, such as Netscape's Secure Socket Layer (SSL) protocol. The communications network 710 can be, for example, a telecommunication network including a wire-based telephone network, pager network, cellular network, or a combination thereof, and a computer network. Accordingly, the communications network 710 can be implemented, in whole or in part, over wireless communications network. In addition, according to various exemplary embodiments of the present invention, the wireless communications network can be implemented over any of various wireless communication technologies, for example: code division multiplexed access ("CDMA"), time division multiplexed access ("TDMA"), frequency division multiplexed access ("FDMA"), orthogonal frequency division multiplexed access ("OFDMA"), global system for mobile communications ("GSM"), Analog Advanced Mobile Phone System ("AMPS"), Universal Mobile Telecommunications System ("UMTS"), 802.11a/b/g/n ("WiFi"), World Interoperability for Microwave Access ("WiMAX"), or Bluetooth.

FIGS. 12A, 12B, 12C, and 12D are a series of flow charts depicting components of an exemplary computer program used in the genetic merit scorecard system according to an exemplary embodiment of the present invention. As illustrated by an exemplary embodiment in FIG. 12A, the computer program generates 101 a genetic merit interface at the remote computers. Through this interface, a user can login to the genetic merit scorecard system 102 if he is already a registered user. If he is not a registered user, a new user record 103 is created. The user can then proceed to access his choices 104 of accessing an existing genetic merit scorecard 105 or of generating a new scorecard. A user can access an existing genetic merit scorecard 106 and exit the system. If he wishes to obtain a genetic merit scorecard for a sale group, he is presented 107 with options of either entering the EPD 110 for the sale group or choosing 108 from the EPD. If he elects 109 to choose EPD from the genetic merit database 730, he is presented with various genetic merits and their corresponding EPD applicable to the sale group. In certain embodiments of the invention, a user may fill out a release form authorizing the release of information on registered animals in the sale group. This form is usually specific to each breed. The breed organization will then send a list of the registered animals with the corresponding EPD, and this information may be used to calculate the relative market value of the sale group. The user may be presented with a series of potential sires as the ancestors of the sale group from the genetic merit database 730 and the user can make appropriate selections. In certain embodiments of the invention, the user is asked to provide more information 111 regarding the sale group, like environmental information 112, management information 114, nutritional information 116, and performance information 118. The user can either skip the step or provide the relevant environmental information 113, management information 115, nutritional information 117, and performance information 119. This is only an exemplary embodiment. The computer program can be designed to accommodate more inputs, including but not limited to, the DNA information associated with the sale group, source of the sale group, or age of the sale group. As illustrated by an exemplary embodiment in FIG. 12C, once the user inputs all this information, the program is configured to run simulation models responsive to these inputs and calculate economic outcomes 149. The program may use 150 current and historical data from the genetic merit database, as described elsewhere in this application. In certain embodiments of the invention, steps 149 and 151 may not be executed during the calculation of the relative market value for a particular sale group. The multivariate regression is used to estimate the $\beta$ periodically but not necessarily on every sale group. In certain embodiments of the invention, steps 149, 150, 151, and 152 may be replaced with steps from FIGS. 3B-3F. FIGS. 3B-3F describe other exemplary computer implemented methods to determine the relative market value of a sale group. In other embodiments of the invention, the genetic merit may be directly utilized in the simulation model. In certain embodiments of the invention, the genetic merit estimates and other information are utilized in steps 150 and 152, and the relative market value and the genetic merit scorecard are calculated for the sale group. The program then determines the relative market value 152, as shown by an illustrative example. Then the genetic merit scorecard is generated 153 and the user is notified about its availability 154. The user is then offered an agreement 155 and a list of payment options 156 to pay for the service. Once the user sends his acceptance 157 and a payment 158, the system verifies the payment and accepts it 159. The genetic merit scorecard is sent to the user 160 in any output format of his choice. The relative market value of a sale group and the genetic merit scorecard may be received by a user in a variety of formats, including but not limited to, paper print-outs, graphical or text displays on a computer or mobile device, electronic messages like an e-mail or text, online formats, and other equivalent formats.

Figure 12A:
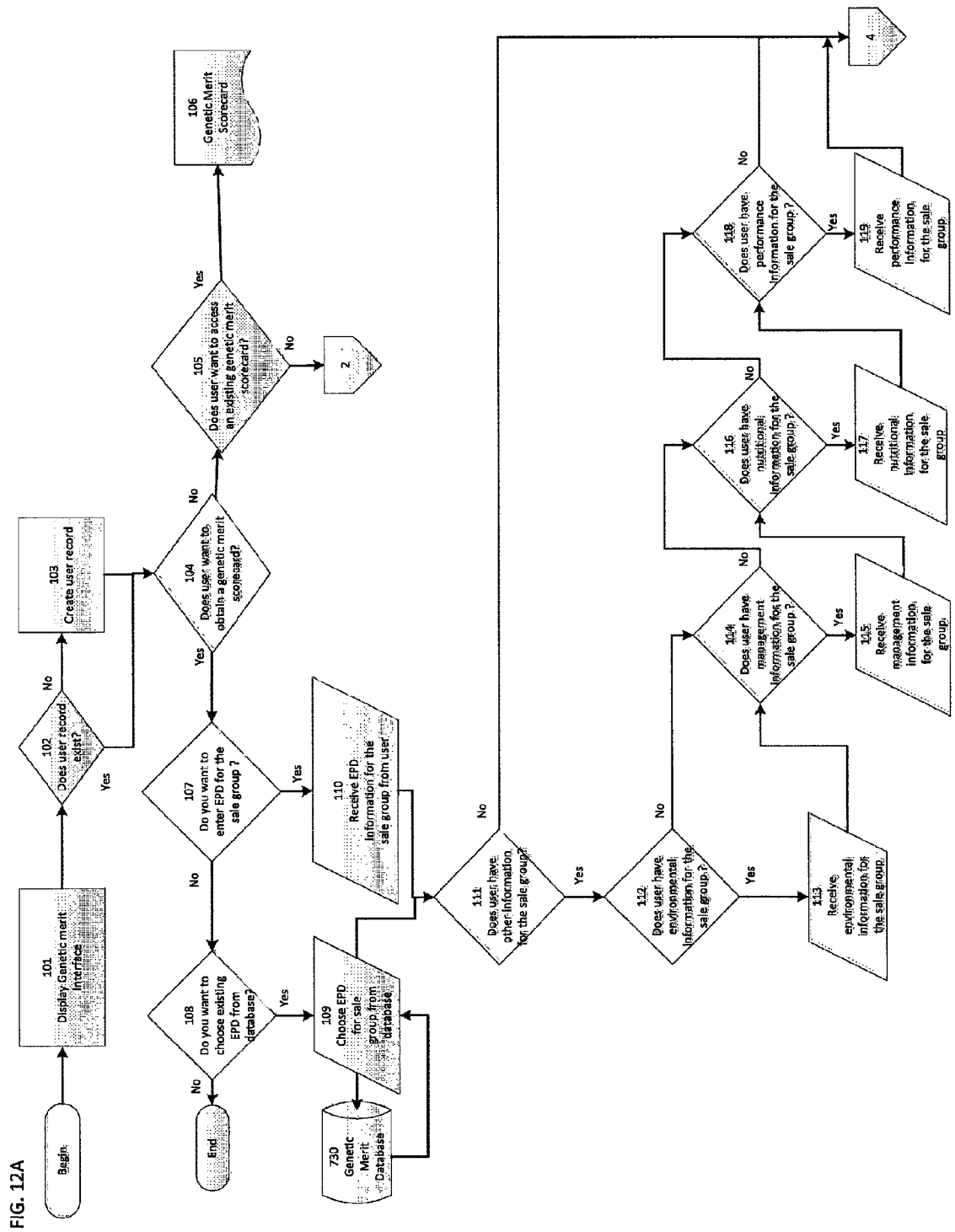
FIGS. 12A, 12B, 12C, and 12D are a series of flowcharts depicting components of an exemplary computer program used in the genetic merit scorecard system, according to an exemplary embodiment of the present invention.
Figure 12B:
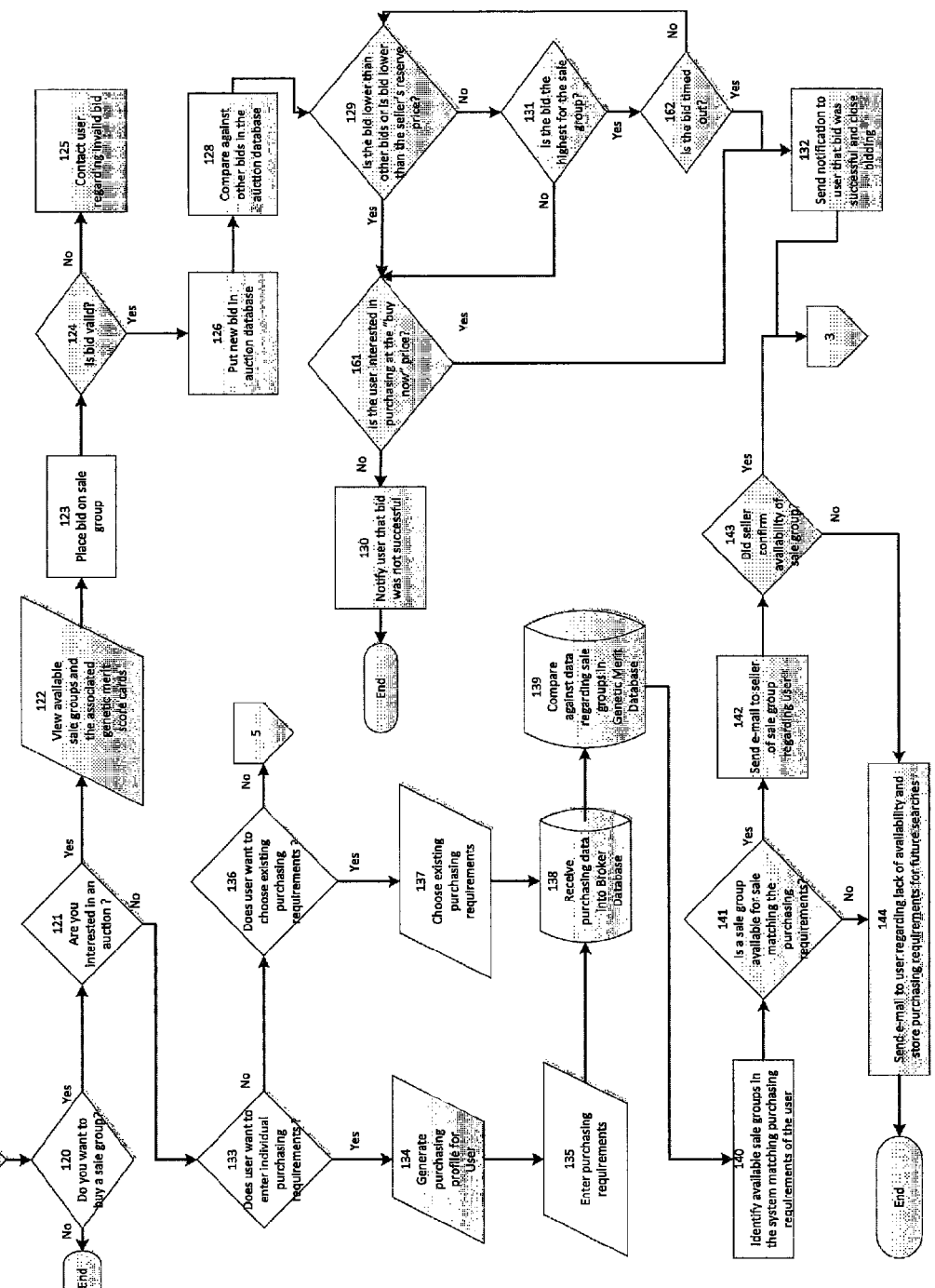

As illustrated by an exemplary embodiment in FIG. 12B, the user of the genetic merit scorecard system can purchase a sale group 120 through one of two exemplary non-limiting ways. If the user is interested in purchasing a sale group through an online auction 121, he can view 122 all available sale groups, the associated genetic merit scorecards and relative market values. The program allows the user to place a bid 123 on a sale group of his choice. If the bid is valid, 124 in that it meets the requirements set by the auctioneering entity, then the bid is accepted and placed 126 in the auction database. If the bid is not valid, then the user is notified 125. The valid bid in the database is then compared to the other bids 128 in the database. If the bid is lower than other bids or the seller's reserve price 129, the user is given an option 161 of purchasing the sale group at a fixed price set by the seller or the system, also known as the "buy now" price. In case of these unsuccessful bids, and if the user is not interested in purchasing the sale group at the fixed price, the user is notified 130. If user is willing to pay the fixed price set 161 by the seller or the system, then bidding closes and the user is notified that his bid was successful 132, and a transaction with the seller of the sale group is initiated (145 on FIG. 12C). If the bid is the highest bid for the sale group 131, but the time period for submitting bids 162 is not over, then the bid is back placed for consideration. But if bid is the highest for the sale group and the time period for bidding is over, then the user is notified that his bid was successful 132, and a transaction with the seller of the sale group is initiated (145 on FIG. 12C). The user is offered an agreement 145 and a list of payment options 146 to pay for the service and/or for the purchase of the sale group. Once the user sends his acceptance and a payment 147, the system verifies the payment and sends it to the seller for his acceptance 148, and the deal is consummated. The agreements, the relative market value of a sale group and the genetic merit scorecard may be received by a user in a variety of formats, including but not limited to, paper print-outs, graphical or text displays on a computer or mobile device, electronic messages like an e-mail or text, and other equivalent formats. The genetic merit scorecard system according to various exemplary embodiments of the present invention can also be adapted to distribute payments to the sellers of the sale groups responsive to receiving payments from the buyers.

Figure 12C:
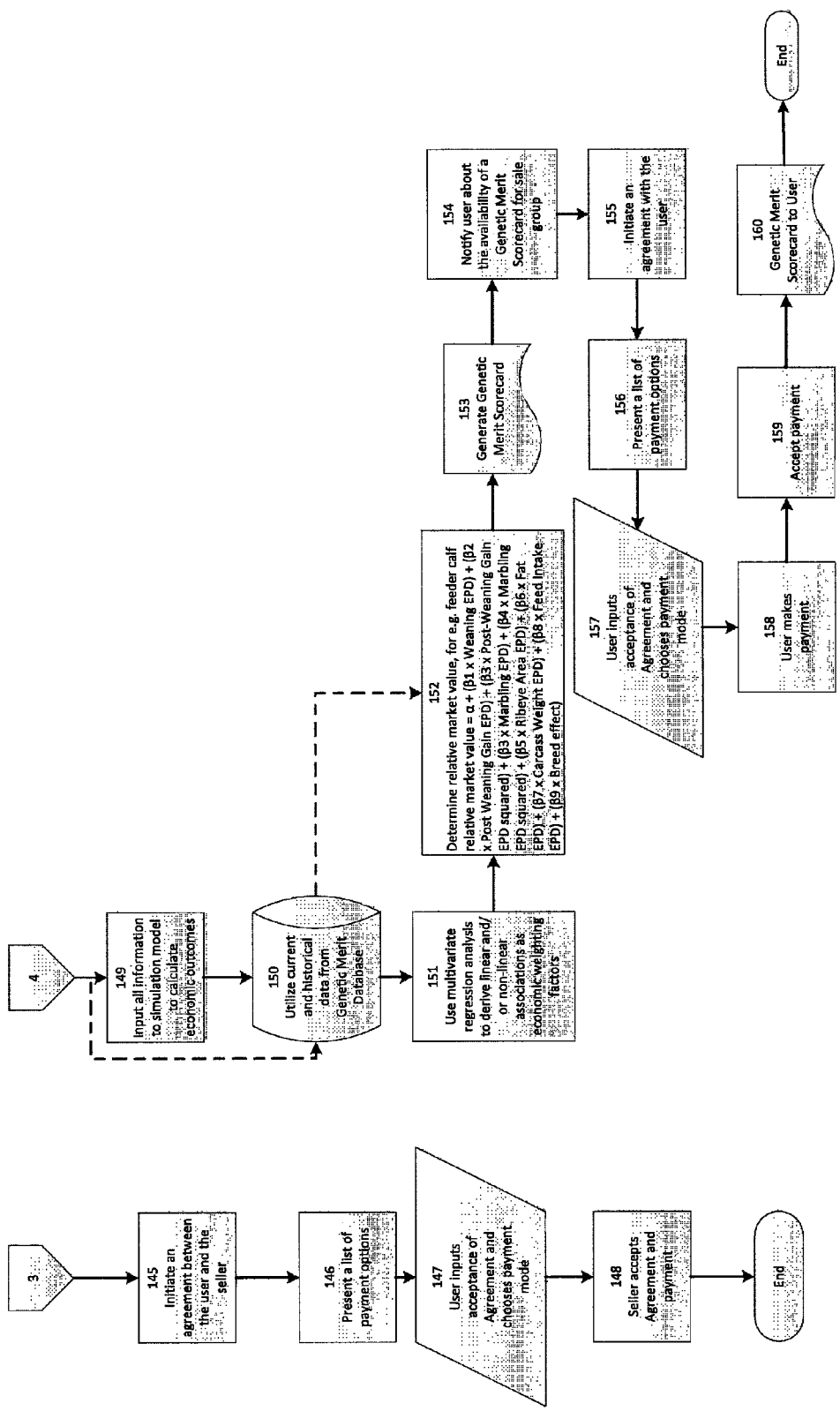

The exemplary embodiment illustrated in FIG. 12B also allows for a user to purchase a sale group without the auction process. Here the user is presented with the choice of entering individualized purchasing requirements 133 or choosing requirements set in the system 136. If the user chooses to input his own requirements, then the program allows for the creation of a user profile 134 and the input of purchasing requirements for the sale group from the user 135. The user can also choose existing purchasing requirements present in the system 137. Once data is received in the broker database regarding the purchasing requirements from the user 138, then the data is compared against the information for the sale groups present in the genetic merit database 139. Once available sale groups meeting the user's purchasing requirements are identified 140, a confirmation process is initiated to verify that the sale group is still available 141. If the sale group is no longer available for sale, then the user is notified regarding the unsuccessful process and his requirements are stored for future notification 144, for example, if a sale group becomes available. A notification is sent to the seller to confirm the continued availability of one or more sale groups 142 and if availability is confirmed by the seller 143, then a transaction with the seller of the sale group is initiated (145 in FIG. 12C). In certain embodiments of the invention, the seller is notified of the interest from the user, and the system may not contain modules facilitating the sales of the sale groups. In other embodiments of the invention, for example as shown in FIG. 12C, the user is offered an agreement 145 and a list of payment options 146 to pay for the service and/or for the purchase of the sale group. Once the user sends his acceptance and a payment 147, the system verifies the payment and sends it to the seller for his acceptance 148, and the deal is consummated. The agreements, the relative market value of a sale group and the genetic merit scorecard may be received by a user in a variety of formats, including but not limited to, paper print-outs, graphical or text displays on a computer or mobile device, electronic messages like an e-mail or text, and other equivalent formats. The genetic merit scorecard system according to various exemplary embodiments of the present invention can also be adapted to distribute payments to the sellers of the sale groups responsive to receiving payments from the buyers.

Figure 12D:
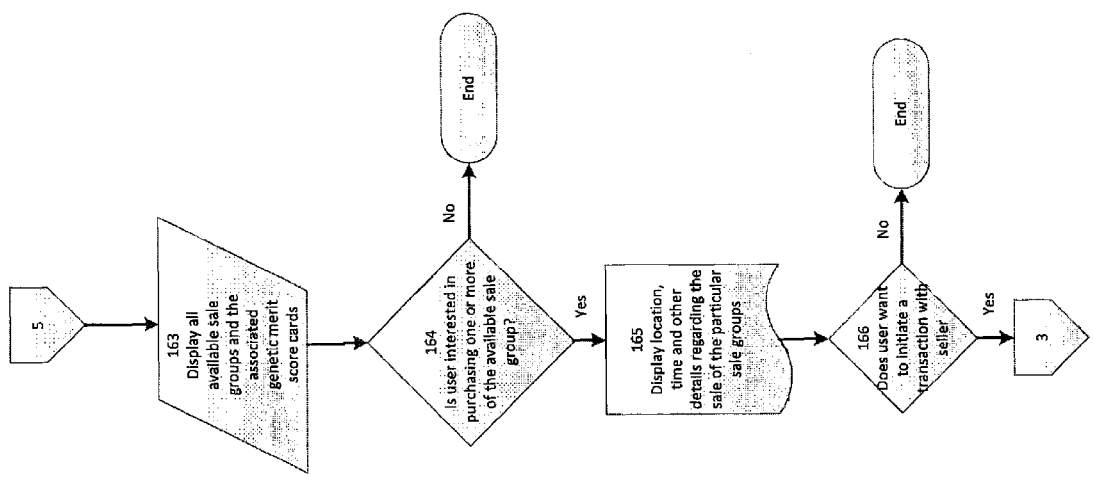

In certain embodiments of the invention, if the user does not wish to enter individualized purchasing requirements 133 or choose requirements set in the system 136, he can view 163 all the available sale groups and their associated information, including the genetic merit scorecards, and relative market value in FIG. 12D. In certain embodiments of the invention, the users may be buyers, who have registered with the genetic merit scorecard system. These registered users may view a "show list" of all available sale groups and their associated information, including the genetic merit scorecards, and relative market value. These lists provide information associated with the sale group, for example the genetic merit scorecard 65, shown in FIG. 6, and Reputation Feeder Cattle Certificate, shown in FIG. 7. In the exemplary embodiment illustrated in FIG. 12D, upon viewing information related to the sale groups, the user can choose to purchase 164 one or more sale groups, and the system will provide further information 165 regarding location, time and other details regarding the sale of the particular sale groups. The user can then choose to initiate purchase transaction 166 with the seller, or exit the system. As shown in an exemplary embodiment in FIG. 12C, the user is then offered an agreement and a list of payment options 146 to pay for the service and/or for the purchase of the sale group. Once the user sends his acceptance and a payment 147, the system verifies the payment and sends it to the seller for his acceptance 148, and the deal is consummated. The agreements, the relative market value of a sale group and the genetic merit scorecard may be received by a user in a variety of formats, including but not limited to, paper print-outs, graphical or text displays on a computer or mobile device, electronic messages like an e-mail or text, and other equivalent formats. The genetic merit scorecard system according to various exemplary embodiments of the present invention can also be adapted to distribute payments to the sellers of the sale groups responsive to receiving payments from the buyers.

It is important to note that while embodiments of the present invention have been described in the context of a fully functional system, those skilled in the art will appreciate that the mechanism of at least portions of the present invention or aspects thereof are capable of being distributed in the form of a computer-readable program product stored in a tangible computer medium and a computer-readable medium of instructions in a variety of forms for execution on a processor, processors, or the like, and that the present invention applies equally regardless of the particular type of signal-bearing media used to actually carry out the distribution. Note, the computer readable program product can be in the form of microcode, programs, routines, and symbolic languages that provide a specific set or sets of ordered operations that control the functioning of the hardware and direct its operation, as known and understood by those skilled in the art. Examples of computer readable media include, but are not limited to: nonvolatile hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs. DVD-R/RWs, DVD+R/RWs, flash drives, memory sticks, HD-DVDs, mini disks, laser disks, Blu-ray disks, and other newer types of memories, and transmission type media such as digital and analog communication links.

The disclosure of U.S. Nonprovisional patent application Ser. No. 14/011,304, filed on Aug. 27, 2013, U.S. Provisional Patent Application Ser. Nos. 61/811,720, filed on Apr. 13, 2013, 61/822,736, filed on May 13, 2013, and 61/860,686, filed on Jul. 31, 2013, are all incorporated herein by reference in their entireties.

Moreover, the foregoing has broadly outlined certain objectives, features, and technical advantages of the present invention and a detailed description of the invention so that embodiments of the invention may be better understood in light of features and advantages of the invention as described herein, which form the subject of certain claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages are better understood from the description above when considered in connec- That claimed is:

1. A computer-implemented method to determine relative market value of a sale group, the computer implemented method comprising the steps of:
  generating a genetic merit interface to display at one or more electronic interfaces, the genetic merit interface allowing an input of a plurality of information associated with the sale group;
  determining, by one or more processors, relative market value and one or more rankings of genetic merits of the sale group responsive to receiving the plurality of information associated with the sale group from the genetic merit interfaces; and
  outputting to one or more electronic interfaces a genetic merit scorecard for the sale group responsive to determining the relative market value and one or more rankings of genetic merits of the sale group, the genetic merit scorecard including the relative market value and one or more rankings of genetic merits of the sale group.

2. The computer-implemented method of claim 1, wherein the plurality of information associated with the sale group includes at least one of the following: genetic merit estimates associated with the sale group, performance information of the sale group, performance information from a contemporary group, performance information of relatives of the sale group, environmental conditions, management information, and nutritional information.

3. The computer-implemented method of claim 2, wherein the genetic merit estimates associated with the sale group includes at least one of the following: genetic merit estimates of the sale group, genetic merit estimates of relatives of the sale group, and combinations thereof.

4. The computer-implemented method of claim 3, wherein the genetic merit estimates of the sale group are obtained from at least one of the following: biometric measurements, DNA analysis, expected progeny differences of the sale group, and combinations thereof.

5. The computer-implemented method of claim 3, wherein the genetic merit estimates of relatives of the sale group are obtained from at least one of the following: biometric measurements, DNA analysis, expected progeny differences of the relatives of the sale group, and combinations thereof.

6. The computer-implemented method of claim 2, wherein the genetic merit estimates associated with the sale group include genetic merit estimates of at least two of the following: average daily gain, carcass weight, marbling, back fat thickness, feed to gain ratio, ribeye area, yield grade, tenderness, percentage of choice, pedigree, breed effects, feed intake, animal health, weaning weight, post-weaning weight gain, maintenance energy, maternal merit, birth weight, or residual feed intake, residual average daily gain, or any linear or non-linear combination of any two or more of these traits.

7. The computer-implemented method of claim 1, wherein the genetic merit scorecard further includes one or more of: documentation of calf management practices associated with the sale group, and source and age identification of the sale group through an USDA approved process positioned to be readily accessible to a user of the one or more electronic interfaces.

8. A computer-implemented method to determine relative market value of a sale group, the computer implemented method comprising the steps of:
  generating a genetic merit interface to display at one or more electronic interfaces, the genetic merit interface allowing an input of a plurality of genetic merit estimates associated with the sale group;
  determining, by one or more processors, relative market value and one or more rankings of genetic merits of the sale group responsive to the plurality of genetic merit estimates from the genetic merit interfaces; and
  outputting to one or more electronic interfaces a genetic merit scorecard for the sale group responsive to determining the relative market value and one or more rankings of genetic merits of the sale group, the genetic merit scorecard including the relative market value and one or more rankings of genetic merits of the sale group.

9. The computer-implemented method of claim 8, wherein the genetic merit estimates associated with the sale group include at least one of the following: genetic merit estimates of the sale group, genetic merit estimates of relatives of the sale group, and combinations thereof.

10. The computer-implemented method of claim 9, wherein the genetic merit estimates of the sale group are obtained from at least one of the following: biometric measurements, DNA analysis, expected progeny differences of the sale group, and combinations thereof.

11. The computer-implemented method of claim 9, wherein the genetic merit estimates of relatives of the sale group are obtained from at least one of the following: biometric measurements, DNA analysis, expected progeny differences of the relatives of the sale group, and combinations thereof.

12. The computer-implemented method of claim 8, wherein the genetic merit estimates associated with the sale group include genetic merit estimates of at least two of the following: average daily gain, carcass weight, marbling, back fat thickness, feed to gain ratio, ribeye area, yield grade, tenderness, percentage of choice, pedigree, breed effects, feed intake, animal health, weaning weight, post-weaning weight gain, maintenance energy, maternal merit, birth weight, or residual feed intake, residual average daily gain, or any linear or non-linear combination of any two or more of these traits.

13. The computer-implemented method of claim 8, wherein the genetic merit scorecard further includes one or more of: documentation of calf management practices associated with the sale group, and source and age identification of the sale group through an USDA approved process positioned to be readily accessible to a user of the one or more electronic interfaces.

14. A computer-implemented method to determine relative market value of a sale group, the computer implemented method comprising the steps of:
  generating a genetic merit interface to display at one or more electronic interfaces, the genetic merit interface allowing an input of a plurality of information associated with the sale group;
  determining, by one or more processors, a plurality of economic weighting factors responsive to the plurality of information associated with the sale group and one or more economic outcomes;
  determining, by one or more processors, relative market value and one or more rankings of genetic merits of the sale group responsive to the plurality of economic weighting factors and the plurality of information associated with the sale group from the genetic merit interfaces; and outputting to one or more electronic interfaces a genetic merit scorecard for the sale group responsive to determining the relative market value and one or more rankings of genetic merits of the sale group, the genetic merit scorecard including the relative market value and one or more rankings of genetic merits of the sale group.

15. The computer-implemented method of claim 14, wherein the plurality of information associated with the sale group includes at least one of the following: genetic merit estimates associated with the sale group, performance information of the sale group, performance information from a contemporary group, performance information of relatives of the sale group, environmental conditions, management information, and nutritional information.

16. The computer-implemented method of claim 15, wherein the genetic merit estimates associated with the sale group include at least one of the following: genetic merit estimates of the sale group, genetic merit estimates of relatives of the sale group, and combinations thereof.

17. The computer-implemented method of claim 16, wherein the genetic merit estimates of the sale group are obtained from at least one of the following: biometric measurements, DNA analysis, expected progeny differences of the sale group, and combinations thereof.

18. The computer-implemented method of claim 16, wherein the genetic merit estimates of relatives of the sale group are obtained from at least one of the following: biometric measurements, DNA analysis, expected progeny differences of the relatives of the sale group, and combinations thereof.

19. The computer-implemented method of claim 15, wherein the genetic merit estimates associated with the sale group include genetic merit estimates of at least two of the following: average daily gain, carcass weight, marbling, back fat thickness, feed to gain ratio, ribeye area, yield grade, tenderness, percentage of choice, pedigree, breed effects, feed intake, animal health, weaning weight, post-weaning weight gain, maintenance energy, maternal merit, birth weight, or residual feed intake, residual average daily gain, or any linear or non-linear combination of any two or more of these traits.

20. The computer-implemented method of claim 14, wherein the genetic merit scorecard further includes one or more of: documentation of calf management practices associated with the sale group, and source and age identification of the sale group through an USDA approved process positioned to be readily accessible to a user of the one or more electronic interfaces.

* * * * *